(12) United States Patent
Kanokogi et al.

(10) Patent No.: US 8,781,780 B2
(45) Date of Patent: Jul. 15, 2014

(54) ELECTRO-OPTICAL DISTANCE MEASURING METHOD AND ELECTRO-OPTICAL DISTANCE MEASURING DEVICE

(75) Inventors: Mitsuru Kanokogi, Tokyo-to (JP); Masahiro Ohishi, Tokyo-to (JP)

(73) Assignee: Kabushiki Kaisha TOPCON, Tokyo-to (KR)

( * ) Notice: Subject to any disclaimer, the term of this patent is extended or adjusted under 35 U.S.C. 154(b) by 346 days.

(21) Appl. No.: 13/144,196

(22) PCT Filed: Dec. 25, 2009

(86) PCT No.: PCT/JP2009/071898
§ 371 (c)(1),
(2), (4) Date: Jul. 12, 2011

(87) PCT Pub. No.: WO2010/084700
PCT Pub. Date: Jul. 29, 2010

(65) Prior Publication Data
US 2011/0270563 A1    Nov. 3, 2011

(30) Foreign Application Priority Data

Jan. 22, 2009  (JP) .................................. 2009-012099

(51) Int. Cl.
*G01C 25/00*  (2006.01)
(52) U.S. Cl.
USPC .............. 702/97; 356/128; 356/445; 359/615
(58) Field of Classification Search
USPC ....................................................... 702/97
See application file for complete search history.

(56) References Cited

U.S. PATENT DOCUMENTS

| 4,770,526 A | 9/1988 | Manhart et al. |
| 5,002,388 A | 3/1991 | Ohishi et al. |

(Continued)

FOREIGN PATENT DOCUMENTS

| DE | 3540157 A1 | 5/1987 |
| EP | 0501493 A2 | 9/1992 |

(Continued)

OTHER PUBLICATIONS

Translation of International Preliminary Report on Patentability/Written Opinion mailed Aug. 18, 2011 in corresponding PCT application No. PCT/JP2009/071898.

(Continued)

*Primary Examiner* — Sujoy Kundu
*Assistant Examiner* — Alvaro Fortich
(74) *Attorney, Agent, or Firm* — Nields, Lemack & Frame, LLC

(57) ABSTRACT

The present invention provides an electro-optical distance measurement, wherein a light from a light source (6) is projected toward an object to be measured (2), a reflection light reflected by the object to be measured is received at a photodetection unit (8), the light from the light source is received by the photodetection unit as an inner light via an inner optical path (11), and a distance to the object to be measured is measured according to the result of photodetection of the reflection light and the inner light of the photodetection unit, and wherein a correction information is acquired based on the inner light, the acquired correction information is stored, a correction value is obtained from the correction information based on the reflection light and the inner light, and a distance is calculated from the correction value and the result of photodetection of the reflection light and the inner light.

13 Claims, 18 Drawing Sheets

(56) References Cited

U.S. PATENT DOCUMENTS

| | | | |
|---|---|---|---|
| 6,333,783 B1 * | 12/2001 | Ohishi | 356/4.01 |
| 6,483,121 B1 * | 11/2002 | Ohishi et al. | 250/559.38 |
| 6,597,007 B2 * | 7/2003 | Mizuno et al. | 250/559.38 |
| 6,803,593 B2 * | 10/2004 | Ohishi et al. | 250/559.29 |
| 6,956,607 B2 * | 10/2005 | Mizuno et al. | 348/308 |
| 7,382,443 B2 * | 6/2008 | Ohtomo et al. | 356/4.01 |
| 7,969,491 B2 * | 6/2011 | Mizuno et al. | 348/294 |
| 2004/0125365 A1 | 7/2004 | Ohtomo et al. | |
| 2007/0263202 A1 | 11/2007 | Ohtomo et al. | |
| 2008/0074638 A1 | 3/2008 | Sakimura et al. | |
| 2009/0161119 A1 | 6/2009 | Kawashima et al. | |

FOREIGN PATENT DOCUMENTS

| | | | |
|---|---|---|---|
| EP | 1772749 | A1 | 4/2007 |
| JP | 1-235889 | A | 9/1989 |
| JP | 5-232231 | A | 9/1993 |
| JP | 5-297140 | A | 11/1993 |
| JP | 8-262138 | A | 10/1996 |
| JP | 11-38138 | A | 2/1999 |
| JP | 2003-149341 | A | 5/2003 |
| JP | 2004-212058 | A | 7/2004 |
| JP | 2004-264116 | A | 9/2004 |
| JP | 2006-337302 | A | 12/2006 |
| JP | 2007-3333 | A | 1/2007 |
| JP | 2007-71595 | A | 3/2007 |
| JP | 2007-93514 | A | 4/2007 |
| JP | 2008-82895 | A | 4/2008 |
| WO | 2007/029613 | A1 | 3/2007 |

OTHER PUBLICATIONS

International Preliminary Report on Patentability/Written Opinion mailed Aug. 4, 2011 in corresponding PCT application No. PCT/JP2009/071898.
International Search Report mailed Feb. 9, 2010 in corresponding international application No. PCT/JP2009/071898.
Journal of the Optical Society of America, vol. 55, No. 10, Oct. 1965, pp. 1205-1209, "Interspecimen Comparison of the Refractive Index of Fused Silica", Malitson.
IEEE-Xplore Digital Library, Mar. 1994, vol. 6, Issue 3, 1 page Abstract, "Temperature dispersion of refractive indexes in some silicate fiber glasses", http://ieeexplore.ieee.org/xpl/freeabs_all.jsp?arnumber=275509, Ghosh.
European Communication, including Extended European Search Report, dated Apr. 12, 2012 in corresponding European Patent Application No. 09838889.5.

* cited by examiner

UPDATING OF CORRECTION INFORMATION

FIG. 14

| INNER SHORT OPTICAL PATH LIGHT QUANTITY | Sd2 | Sd2 | Sd2 | Sd2 | Sd2 |
|---|---|---|---|---|---|
| INNER LONG OPTICAL PATH LIGHT QUANTITY | Sd0 | Sd1 | Sd2 | Sd3 | Sd4 |
| PHASE DIFFERENCE BETWEEN LONG OPTICAL PATH AND SHORT OPTICAL PATH | Ld0 | Ld1 | Ld2 | Ld3 | Ld4 |

→ → → → →

| LIGHT QUANTITY | Sd0 | Sd1 | Sd2 | Sd3 | Sd4 |
|---|---|---|---|---|---|
| CORRECTION AMOUNT | Ld0 | Ld1 | Ld2 | Ld3 | Ld4 |

CORRECTION INFORMATION

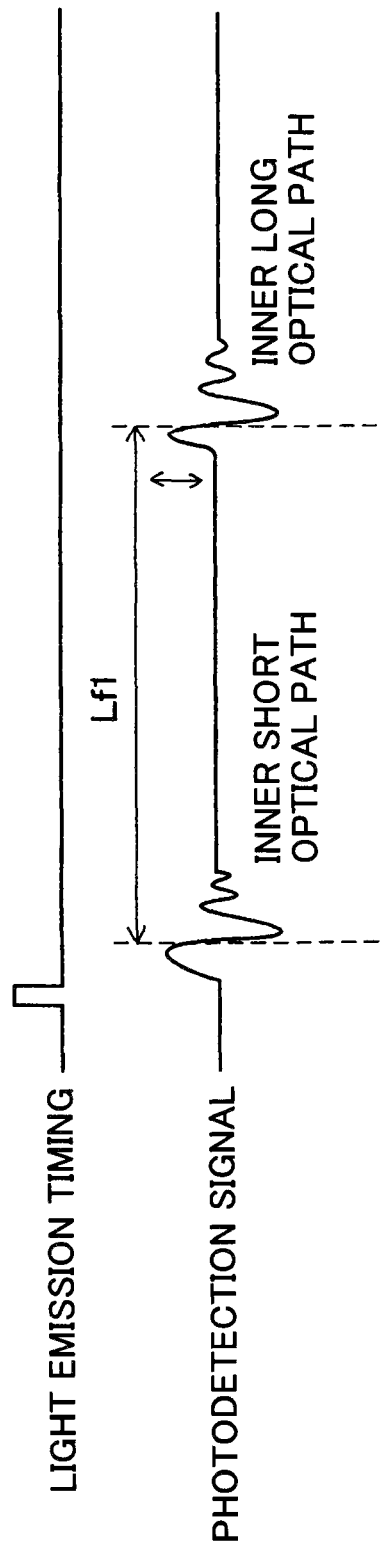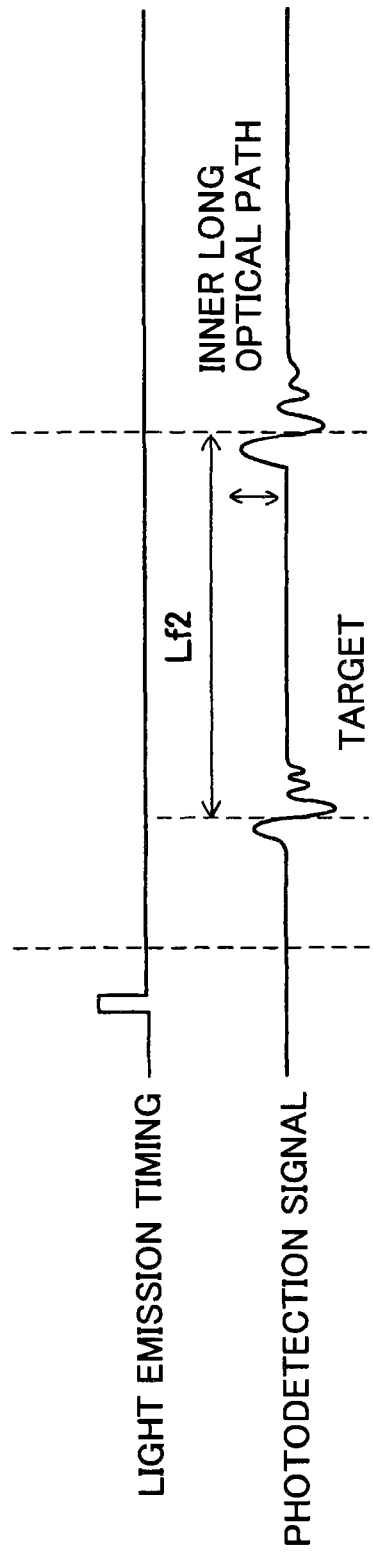

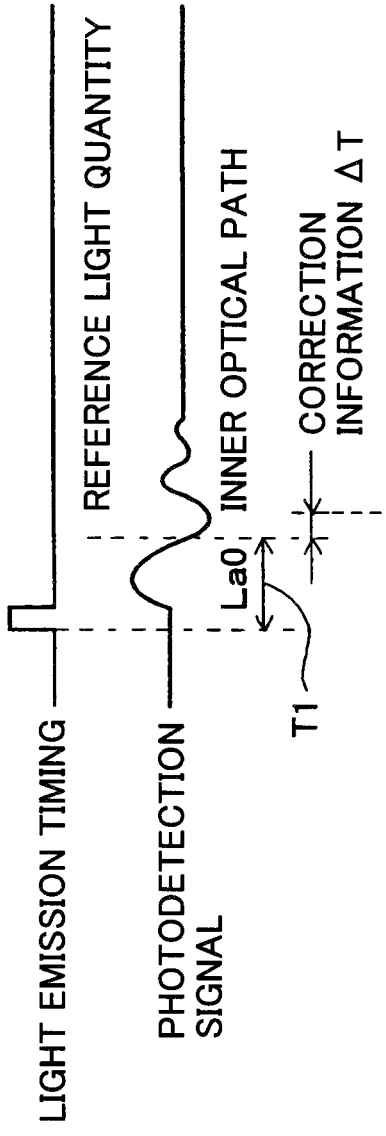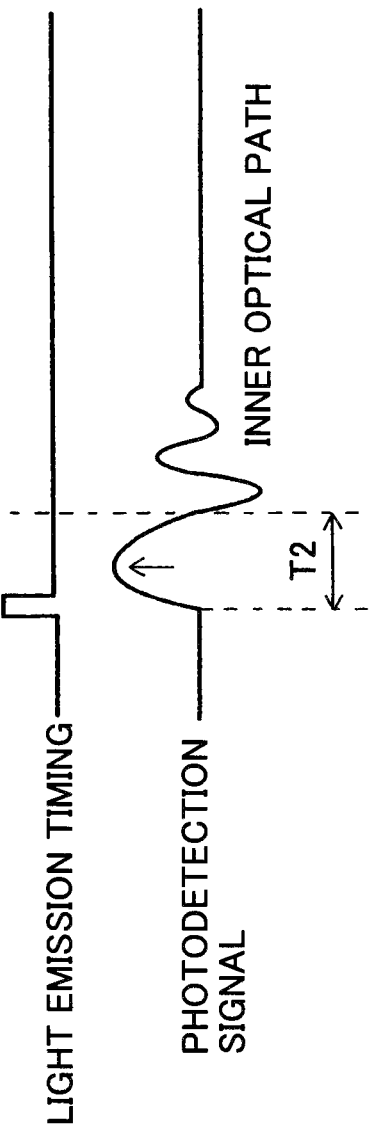
FIG. 20(A) (PRIOR ART)
FIG. 20(B) (PRIOR ART)

ELECTRO-OPTICAL DISTANCE MEASURING METHOD AND ELECTRO-OPTICAL DISTANCE MEASURING DEVICE

FIELD OF THE INVENTION

The present invention relates to an electro-optical distance measuring method and an electro-optical distance measuring device for projecting a laser beam to an object to be measured and for measuring a distance by receiving a reflection light from the object to be measured.

BACKGROUND ART

A technique has been known in the past, according to which a laser beam is projected to an object to be measured, and a reflection light from the object to be measured is received by a photodetection element, and a distance to the object to be measured is determined.

In general, it is known in electro-optical distance measurement that error may occur in a result of distance measurement due to light quantity of a reflection light from the object to be measured. This is because electrical phase characteristics of a photodetection element and a photodetection circuit are subject to slight and minute change when a receiving light quantity is changed. For the purpose of reducing the changes of the phase characteristics as much as possible, it has been practiced in the past to perform an electric adjustment on the photodetection circuit for each machine or device in the manufacturing process.

FIG. 19 is a diagram to show phase characteristics A of a photodetection circuit under non-adjustment conditions and phase characteristics B after the adjustment. In FIG. 19, the light quantity is represented on the axis of abscissa, and the phase is represented on the axis of ordinate.

Here, the term "phase" means a time T1 as shown in FIG. 20(A). The time T1 means a time period up to the moment when the photodetection signal is turned to 0 for the first time when a light emission timing signal is issued and the photodetection element outputs a photodetection signal. The time T1 means a moment when it is judged that the photodetection element receives the light.

As shown in FIG. 20(B), when receiving light quantity (received light quantity) increases, a time T2 is extended by ΔT with respect to the time T1 of FIG. 20(A), and a delay (deviation of the phase) occurs in the light receiving time.

Therefore, as seen in FIG. 19, in case of non-adjustment (phase characteristics A), it is seen that the phase is changed considerably when the light quantity is changed. For this reason, in case of non-adjustment, error may be included in the result of distance measurement.

In case of the phase characteristics B, even when the receiving light quantity is changed as the result of adjustment of the photodetection circuit, almost no change occurs in the phase, and stable phase characteristics can be maintained for wider light quantity range.

Another adjustment method is disclosed in JP-A-2004-264116 (the Patent Document 1). According to the method described in JP-A-2004-264116 (the Patent Document 1), the change of the receiving light quantity occurs over total light receiving (photodetection) range in the manufacturing process. Then, a relation between the receiving light quantity over total photodetection range and electrical phase change is determined. This relation between the receiving light quantity and electrical phase change (i.e. information of receiving light quantity—phase change) is stored in a storage unit inside the device, and error is corrected according to (information of receiving light quantity—phase change) thus stored at the time of distance measurement.

Further, the phase characteristics of the photodetection element and the photodetection circuit are also changed according to the environment where the device is used and also to the changes over time. For instance, the distance measuring device is also used in various regions on the earth including cold climate region such as Russia or in tropical forests in equatorial region. Therefore, the distance measuring device is expected so that the operation can be performed over the temperature range from −30° C. to +60° C. In such case, the temperature of the photodetection element or the photodetection circuit is changed. As a result, changes also occur in the relation between the receiving light quantity and electrical phase characteristics, and the changes often appear as measurement error.

Because the error caused by the change of environment cannot be eliminated by electrical adjustment of the photodetection circuit at the time of manufacture, the photodetection circuit must be composed of electrical components with high performance characteristics over wide temperature range so that measurement error may be within the change specified in the specification of the product even when environmental conditions have changed. Accordingly, higher costs are required for the components and the manufacturing cost is increased.

When many years have elapsed after the manufacture, electrical characteristics at the time of manufacture are changed due to deterioration of the quality of electronic components. In this case, deviation gradually occurs among electrical adjustment at the time of manufacture, information for correction stored in the device and actual conditions of the device, and the deviation appears as errors in the measured distance.

Further, to perform electrical adjustment or to store information for correction, the facilities for such purposes are needed, and more time is required for the adjustment and this leads to the increase of the manufacturing cost.

To solve the above problems, the present invention provides an electro-optical distance measuring method and an electro-optical distance measuring device, by which it is possible to eliminate the procedures of electrical adjustment on the photodetection circuit in the manufacturing process and to perform distance measurement at higher accuracy to exclude the photodetection circuit, which shows lower phase changes over wide temperature range and without giving consideration on the deterioration of electronic components to the changes over time.

[Patent document 1] JP-A-2004-264116
[Patent Document 2] JP-A-2004-212058
[Patent Document 3] JP-A-2008-82895

DISCLOSURE OF THE INVENTION

The present invention provides an electro-optical distance measuring method for projecting a light from a light source toward an object to be measured, for receiving a reflection light from the object to be measured at a photodetection unit, for receiving the light from the light source as an inner light via an inner optical path by the photodetection unit, and for measuring a distance to the object to be measured according to the result of photodetection of the reflection light and the inner light of the photodetection unit, wherein the method comprises a correction information acquiring step for acquiring the correction information based on the inner light, a storing step for storing the correction information acquired and a calculating step, wherein the calculating step is to obtain a correction value from the correction information based on the reflection light and the inner light and to calculate a distance from the correction value and the result of photodetection of the reflection light and the inner light of the photodetection unit.

Also, the present invention provides an electro-optical distance measuring method, wherein the correction information acquiring step is to acquire the correction information by changing light quantity of the inner light. Further, the invention relates to an electro-optical distance measuring method as described above, wherein the calculating step comprises a calculating prior to correction step for calculating a distance prior to the correction based on the reflection light and the inner light, a correction value obtaining step for obtaining the correction value from the correction information stored according to the light quantity of the reflection light and to the light quantity of the inner light, and a distance calculating step for calculating a distance corrected based on a distance calculated before correction and based on the correction value. Also, the invention relates to an electro-optical distance measuring method as described above, wherein the calculating step changes the light quantity of the inner light and performs the calculation a plurality of times and further comprises an updating step for updating the correction information based on a first photodetection signal acquired from the photodetection unit on a first light quantity and on a second photodetection signal acquired from the photodetection unit on a second light quantity. Further, the invention relates to an electro-optical distance measuring method as described above, wherein the first light quantity is a preset reference light quantity and the second light quantity is gradually changed. Also, the invention relates to an electro-optical distance measuring method as described above, wherein the correction information acquiring step is executed when power is turned on to an electro-optical distance measuring device for performing electro-optical distance measurement. Further, the invention relates to an electro-optical distance measuring method as described above, wherein the inner optical path includes a first inner optical path and a second inner optical path being different in optical length, and wherein the correction information acquiring step is to acquire the correction information according to a first inner light passing via the first inner optical path and to a second inner light passing via the second inner optical path. Also, the invention relates to an electro-optical distance measuring method as described above, wherein the inner optical path includes a first inner optical path and a second inner optical path being different in optical length, and wherein the calculating step comprises a calculating prior to correction step for calculating a distance prior to correction based on the reflection light and based on a first inner light passing via the first inner optical path or based on a second inner light passing via the second inner optical path, and an updating step for updating the correction information based on the first inner light and the second inner light. Further, the invention relates to an electro-optical distance measuring method as described above, wherein the first inner light is set to a reference light quantity, and the light quantity of the second inner light is gradually changed. Also, the invention relates to an electro-optical distance measuring method as described above, wherein the second inner optical path has an optical fiber of a predetermined length. Further, the invention relates to an electro-optical distance measuring method as described above, wherein the calculating step further comprises a preliminary measurement step for measuring a distance to the object to be measured only by the reflection light, and a selecting step for selecting the calculation of a distance according to which of the first inner light or the second inner light based on the result obtained in the preliminary measurement step.

Also, the present invention provides an electro-optical distance measuring device, comprising a light source, a photodetection unit, an outer optical path for guiding a light from the light source reflected by an object to be measured toward the photodetection unit as a reflection light, an inner optical path for guiding a light from the light source toward the photodetection unit as an inner light, an inner light quantity changing unit for changing light quantity of the inner light, and a control unit including an arithmetic unit for calculating a distance to the object to be measured according to a photodetection signal from the photodetection unit, wherein the control unit receives the inner light by the photodetection unit while changing the light quantity of the inner light by the inner light quantity changing unit and acquires correction information based on a photodetection signal from the photodetection unit.

Further, the invention relates to an electro-optical distance measuring device as described above, wherein the control unit comprises a storage unit for storing the correction information, and wherein the arithmetic unit calculates a distance based on a photodetection signal of the reflection light, based on a photodetection signal of the inner light, and based on the correction information. Also, the invention relates to an electro-optical distance measuring device as described above, wherein the inner optical path has a first inner optical path and a second inner optical path being different in optical length, wherein the inner light quantity changing unit is provided on one of the first inner optical path or the second inner optical path, and wherein the control unit acquires the correction information based on a signal of a light passing via the first inner optical path and the second inner optical path among the signals received by the photodetection unit. Further, the invention relates to an electro-optical distance measuring device as described above, wherein the inner optical path has a first inner optical path and a second inner optical path being different in optical length, wherein the inner light quantity changing unit is provided on one of the first inner optical path or the second inner optical path, and wherein the control unit acquires the correction information based on a signal of a light passing via the first inner optical path and the second inner optical path among the signals received by the photodetection unit and updates the correction information stored by the updated correction information.

BRIEF DESCRIPTION OF THE DRAWINGS

FIG. 14 is a time chart to show acquisition of correction information in the second embodiment;

FIG. 15 is a time chart to show a relation between light emission timing and each photodetection signal of an outer optical path, of an inner short optical path, and of an inner long optical path at the time of short distance measurement in the second embodiment. FIG. 15(A) shows photodetection timing on the inner short optical path and on the inner long optical path, and FIG. 15(B) shows photodetection timing on the outer optical path and the inner long optical path;

FIG. 20(A) and FIG. 20(B) each represents light emission timing and photodetection signal when correction information is acquired on the conventional type electro-optical distance measuring device.

LEGEND OF REFERENCE NUMERALS

Figure 1:
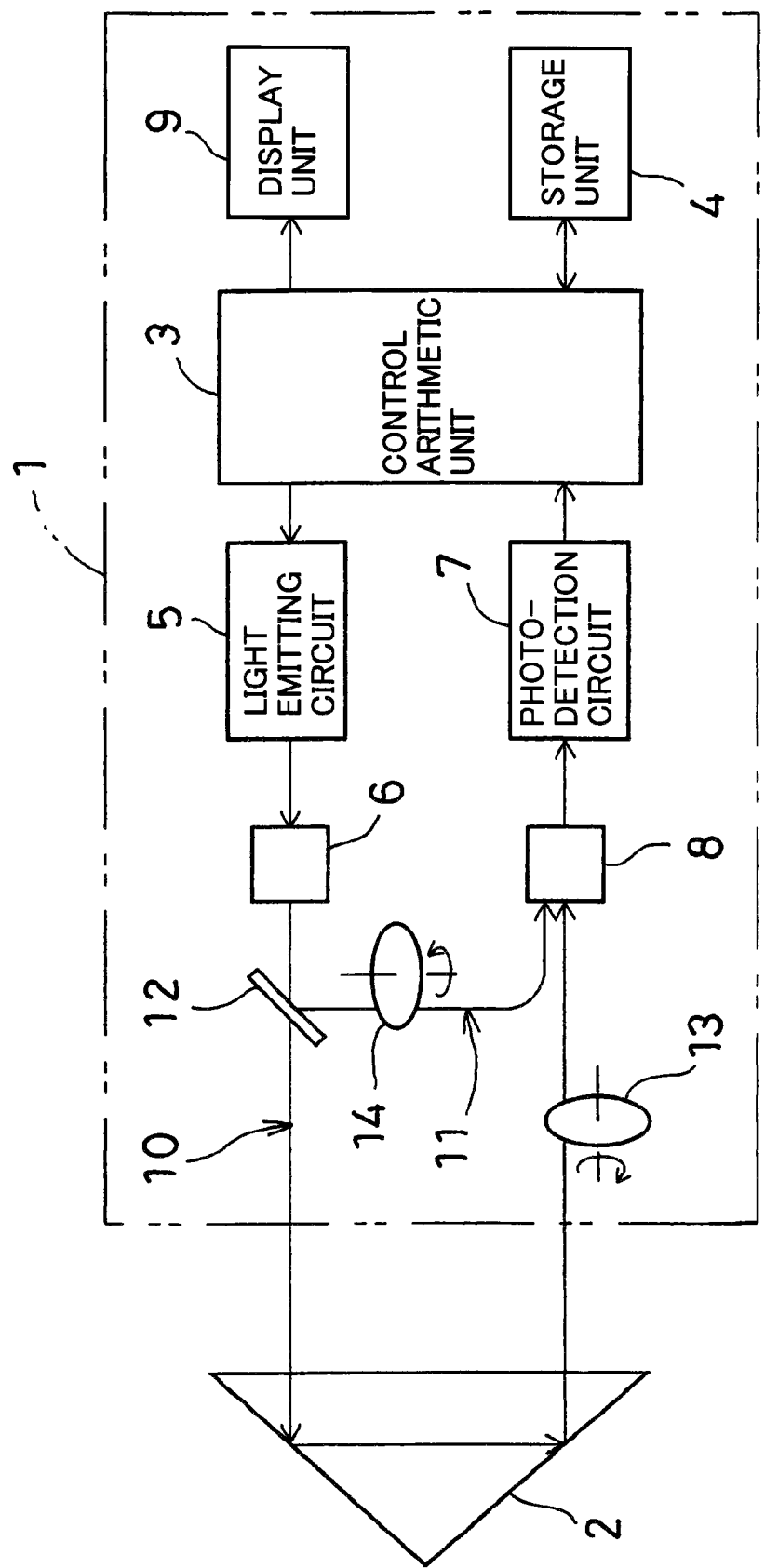
FIG. 1 is a schematical block diagram to show a first embodiment of the present invention.
Figure 2:
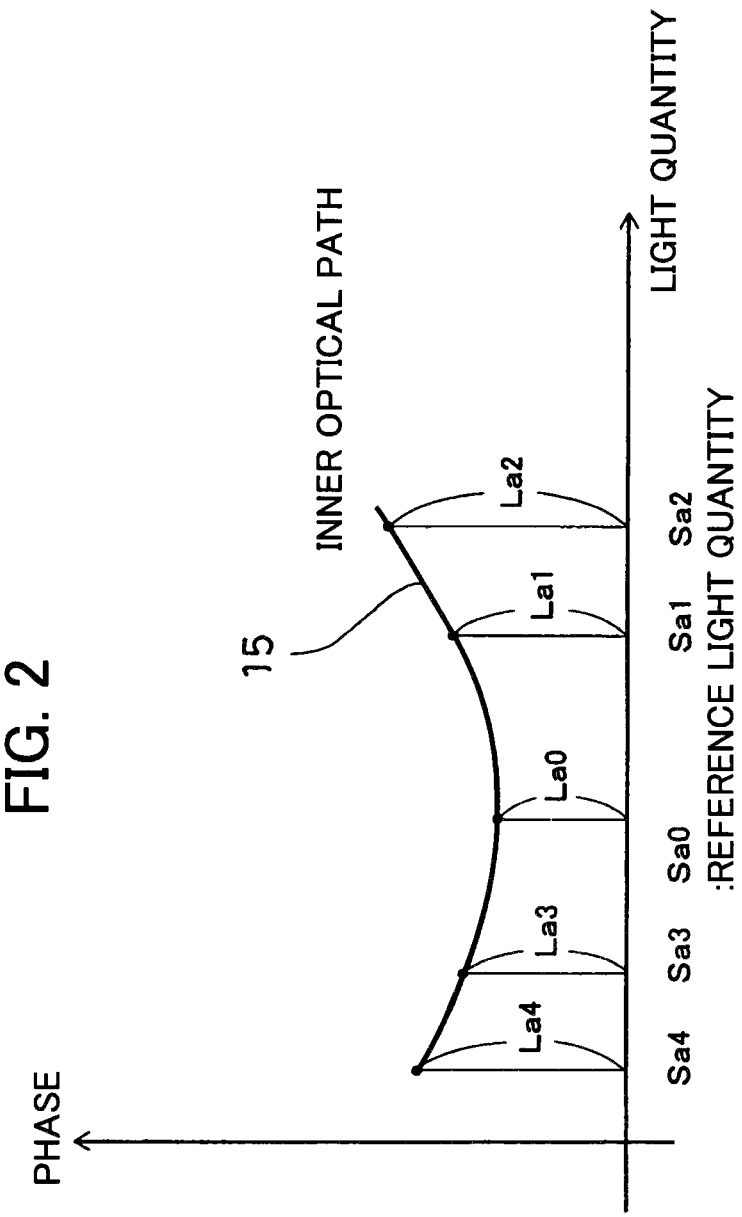
FIG. 2 is a diagram to show correction information of a light receiving system (photodetection system) based on light quantity change and on phase change over total light quantity level in the first embodiment.
Figure 3:
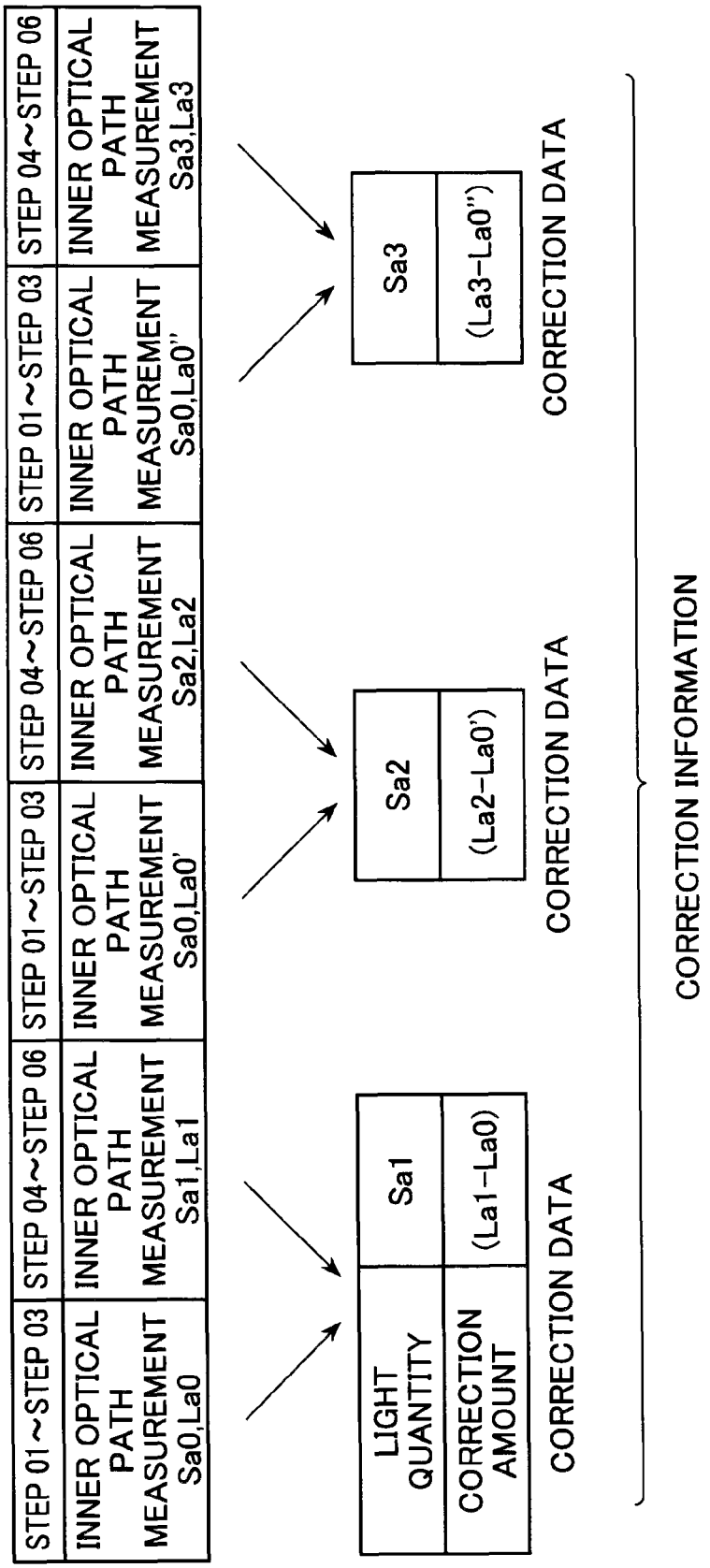
FIG. 3 is a time chart to explain acquisition of correction information in the first embodiment.
Figure 4:
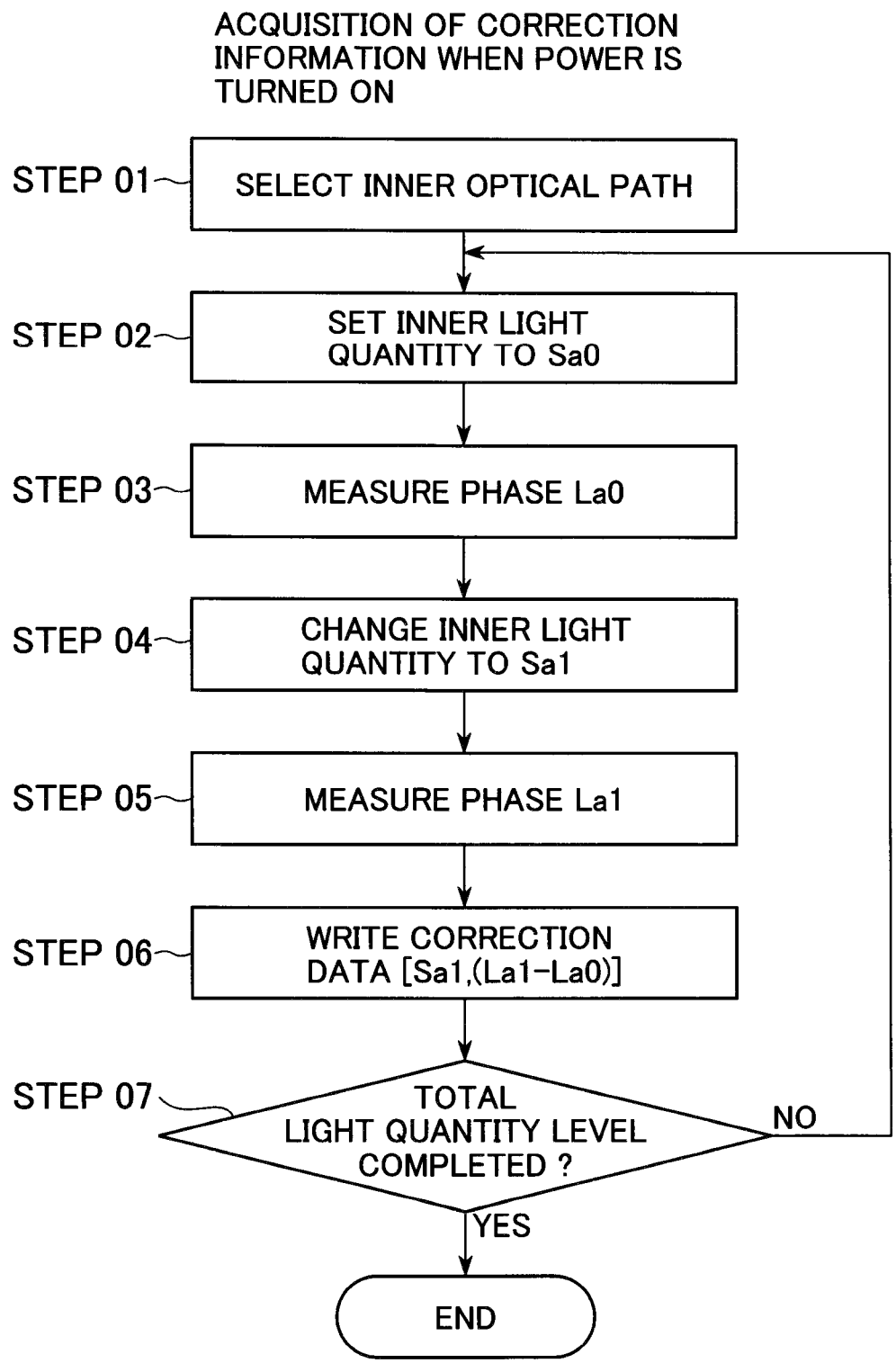
FIG. 4 is a flow chart to show acquisition of correction information when power to an electro-optical distance measuring device is turned on in the first embodiment.

1 Electro-optical distance measuring device
2 Object to be measured
3 Control arithmetic unit
5 Light emitting circuit
7 Photodetection circuit
8 Photodetection element
10 Outer optical path
11 Inner optical path
11*a* Inner short optical path
11*b* Inner long optical path
12 Optical path changeover unit
13 Outer light quantity adjusting means
14 Inner light quantity adjusting means
21 Electro-optical distance measuring device
22 Object to be measured
23 Reference plane forming unit
24 Distance measuring unit
25 Laser beam for forming reference plane
26 Distance measuring light
27 Photodetection device
28 Prism
30 High speed diaphragm
31 First half-mirror
32 Second half-mirror
33 Third half-mirror
36 First light interceptor
37 Second light interceptor
38 Low speed diaphragm
39 Optical fiber

BEST MODE FOR CARRYING OUT THE INVENTION

Description will be given below on embodiments of the present invention by referring to the attached drawings.

First, referring to FIG. 1, description will be given on an example of an electro-optical distance measuring device, to which the present invention is applied. The electro-optical distance measuring device in the present embodiment is an electro-optical distance measuring device for projecting a pulsed light of a laser beam and for measuring a distance for each pulsed light.

In FIG. 1, reference numeral 1 denotes an electro-optical distance measuring device, and numeral 2 denotes an object to be measured (target), e.g. a prism.

The electro-optical distance measuring device 1 comprises a control arithmetic unit 3, a storage unit 4, a light emitting circuit 5, a light emitting element 6 serving as a light source, a photodetection circuit (light receiving circuit) 7, a photodetection element 8 serving as a photodetection unit, and a display unit 9.

The storage unit 4 comprises a data storage region and a program storage region. In the data storage region, data such as a distance measurement data, a correction data, a correction information, etc. are stored. In the program storage region, the following programs are stored: a sequence program for carrying out distance measurement of the electro-optical distance measuring device 1, a distance calculating program for calculating a distance based on a photodetection result and/or correction information from the photodetection circuit 7, a correction information preparing program for preparing correction information according to the correction data, a correction program for calculating correction values such as correction phase difference or the like from the correction information, and other programs.

The light emitting element 6 is a light source for emitting a laser beam as a pulsed light, and the light emitting element 6 is driven by the light emitting circuit 5. The emitted pulsed light is projected to the object to be measured 2 via a distance measuring optical path (hereinafter referred as "outer optical path") 10 as a pulsed distance measuring light. A reflection light reflected by the object to be measured 2 is received by the photodetection element 8 via the outer optical path 10. The electro-optical distance measuring device 1 has an inner reference optical path (hereinafter referred as "inner optical path") 11, and the inner optical path 11 receives and detects the pulsed light emitted by the light emitting element 6 at the photodetection element 8 as an inner reference light.

It is so designed that the outer optical path 10 and the inner optical path 11 are changed over by an optical path changeover unit 12. When the outer optical path 10 is selected by the optical path changeover unit 12, a pulsed distance measuring light emitted from the light emitting element 6 is projected via the outer optical path 10 and enters the photodetection element 8 via the outer optical path 10.

When the inner optical path 11 is selected by the optical path changeover unit 12, an inner reference light emitted from the light emitting element 6 is projected via the inner optical path 11 and enters the photodetection element 8 via the inner optical path 11.

On a return course of the outer optical path 10 and on the inner optical path 11, there are provided an outer light quantity adjusting means 13 and an inner light quantity adjusting means 14, respectively. The outer light quantity adjusting means 13 and the inner light quantity adjusting means 14 can be operated independently from each other.

Each of the outer optical light quantity adjusting means 13 and the inner light quantity adjusting means 14 is a diaphragm, for instance. It is a circular disk with a diaphragm aperture formed on the same circumference so that an aperture diameter is gradually decreased or the aperture diameter is gradually increased. The circular disk is rotated by using an actuator such as motor, and the light quantity to enter the photodetection element 8 can be gradually increased or decreased. Further, each of the outer light quantity adjusting means 13 and the inner light quantity adjusting means 14 is a density filter, and the density filter may be so designed that light transmissivity is gradually decreased or increased in circumferential direction on the same circumference.

When distance is measured by the electro-optical distance measuring device 1, the outer optical path 10 is selected by the optical path changeover unit 12. Then, the light emitting circuit 5 is driven, and a pulsed distance measuring light is projected for a predetermined time period and a reflection light from the object to be measured 2 is received by the photodetection element 8. A photodetection signal from the photodetection element 8 is processed by signal processing at the photodetection circuit 7, and the result is stored in the storage unit 4.

The inner optical path 11 is selected by the optical path changeover unit 12. The inner reference light is received by the photodetection element 8 for a predetermined time period via the inner optical path 11. Then, the received light is processed by signal processing as required at the photodetection circuit 7, and the result is stored in the storage unit 4. At the control arithmetic unit 3, a distance to the object to be measured 2 is calculated according to phase difference between the reflection light stored in the storage unit 4 and the inner reference light.

In the distance calculation, an inner optical path length of the inner optical path 11 is already known. Thus, by subtracting the inner optical path length from the calculation result, the distance can be determined accurately, and errors on the light emitting circuit 5 and the photodetection circuit 7 can be set off.

Next, as described above, when the receiving light quantity is changed, electric phase characteristics of the photodetection element and the photodetection circuit are slightly changed. Also, according to temperature change in the environmental condition, the relation between the receiving light quantity and electrical phase characteristics is also changed. Further, the relation between the receiving light quantity and electrical phase characteristics is also changed according to the changes over time. Therefore, it is necessary to correct the changes in electrical phase characteristics of the photodetection circuit regarding increase or decrease of the receiving light quantity.

In the present embodiment, correction information to correct the result of measurement is acquired (self-acquisition) by using the inner optical path 11 at the time to start the measurement, i.e. when the power to the electro-optical distance measuring device 1 is turned on. Further, the correction information is acquired from time to time during measurement operation, and the correction information is updated. Therefore, distance measurement can be performed adequately according to the newest correction information. The correction information is acquired at the starting of the measurement and also during the measurement. As a result, various factors are included in the changes such as the changes caused by environmental condition, the changes over time, and the change in the electrical phase characteristics (dynamic phase change) of the photodetection circuit 7 in operation. Thus, errors caused by the environmental conditions, the changes over time, and the dynamic phase change can be eliminated in the results of distance measurement.

First, referring to FIG. 1 to FIG. 4, description will be given on self-acquisition of the correction information.

To cope with the temperature change and the changes over time adequately, self-acquisition of the correction information is automatically carried out when the power is turned on. The information can be acquired by using the inner optical path 11 only, and there is no need to install a prism or the like outside.

The inner optical path 11 is selected by the optical path changeover unit 12 (Step 01).

Based on a light emitting instruction from the control arithmetic unit 3, the light emitting circuit 5 generates light emission timing, and a pulsed light is emitted from the light emitting element 6 based on the light emission timing. The pulsed light is projected to the inner optical path 11 via the optical path changeover unit 12 as an inner reference light. After the light quantity is adjusted by the inner light quantity adjusting means 14, the light is received by the photodetection element 8. The light quantity after light quantity adjustment is the reference light quantity Sa0, for instance (Step 02).

A photodetection signal (an electric signal) is issued from the photodetection element 8. After the photodetection signal is processed by signal processing as necessary such as AD conversion, sample & hold, etc. by the photodetection circuit 7, the photodetection signal is inputted to the control arithmetic unit 3. A phase of the photodetection signal of the photodetection element 8, i.e. phase La0 at the reference light quantity Sa0, is determined. Then, the phase La0 is associated with Sa0, and the result is stored in the storage unit 4 (Step 03).

Next, the light quantity is adjusted by the inner light quantity adjusting means 14, and after the light quantity of the inner optical path 11 is adjusted to Sa1, a phase La1 when the light quantity is Sa1 is obtained (Step 04 and Step 05). In this case, phase difference (La1−La0) is the electric phase change when the light quantity is changed from the reference light quantity Sa0 to the light quantity Sa1.

The control arithmetic unit 3 associates this light quantity Sa1 with the phase difference (La1−La0) and stores this light quantity Sa1 associated with the phase difference (La1−La0) in the storage unit 4 as correction data (see FIG. 3) (Step 06).

Similarly, the phase change (Lan−La0) to the light quantity San is determined one after another when the light quantity is sequentially changed, i.e. the reference light quantity So0 and the light quantity Sa2, and the reference light quantity Sa0 and the light quantity Sa3, and further, the reference light quantity Sa0 and the light quantity Sa4. Then, the phase changes (Lan−La0) are associated with each light quantity San, and the light quantity San and the phase changes (Lan−La0) associated are stored in the storage unit 4 (see FIG. 3).

By the above operation, changes of light quantity over the total light quantity level and the phase changes corresponding to the light quantity changes are stored in the storage unit 4 as correction data. Based on the correction data, correction information (correction curve 15; see FIG. 2) is prepared, and the correction curve 15 is also stored in the storage unit 4.

Here, the phase La0 of the reference light quantity Sa0 is obtained for each of the changing light quantities, and the phase La0 thus obtained is subtracted from the phase change Lan. This is done for the purpose of setting off an electrical time delay change of the photodetection circuit 7 caused by the elapsed time. Accordingly, it is for the purpose of eliminating errors, which may occur when the phase La0 to the reference light quantity Sa0 is changed.

As described above, by merely using the inner optical path 11, correction information over the total light quantity level can be acquired.

Meanwhile, the measuring operation by the electro-optical distance measuring device 1 is generally carried out in outdoor condition. Because of temperature change in the operating environment and of self-heating inside the equipment, electrical phase characteristics of the photodetection circuit 7 and the photodetection element 8 are constantly changed. That is to say, the value of the correction information acquired when power is turned on is not at constant level from the starting to the end of the measuring operation, and the value of the correction information must be constantly updated. The updating of the correction information must be carried out without hindering distance measurement operation, which is the primary purpose of the electro-optical distance measuring device 1.

By the present embodiment, it is possible to acquire the correction information during the distance measuring operation and to update the correction information.

Now, referring to FIG. 1 and FIG. 5 to FIG. 8, description will be given on distance measuring operation by the electro-optical distance measuring device 1, on the acquisition of correction data during distance measurement, and on the updating of the correction information.

Figure 5:
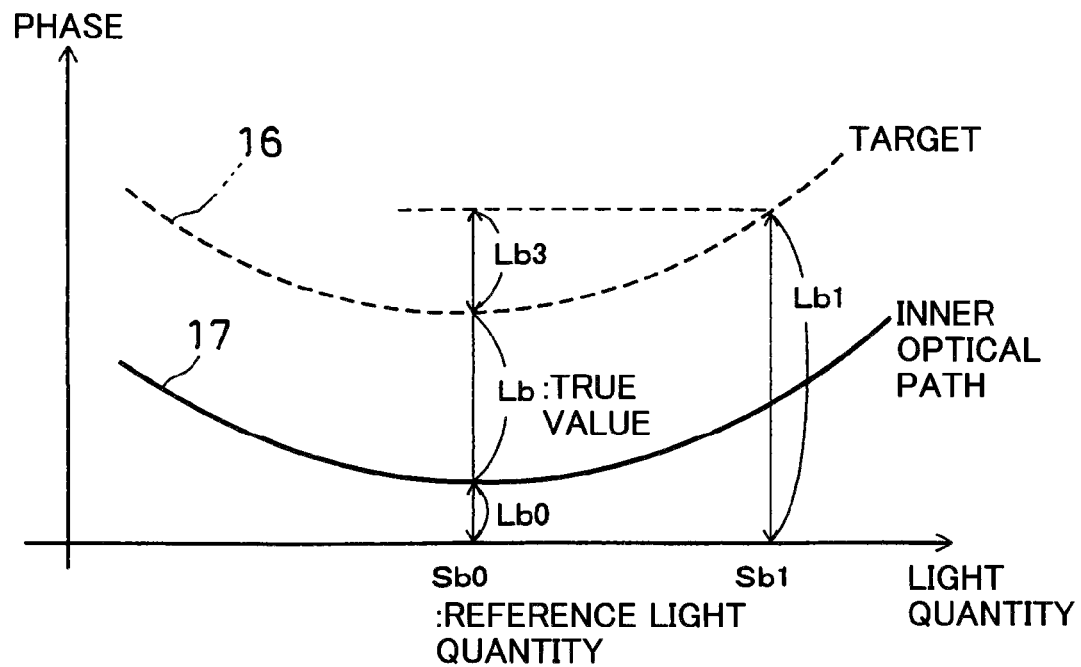
FIG. 5 is a diagram to show a relation between receiving light quantity (photodetection amount) and phase on an outer optical path and on an inner optical path of the electro-optical distance measuring device.
Figure 6:
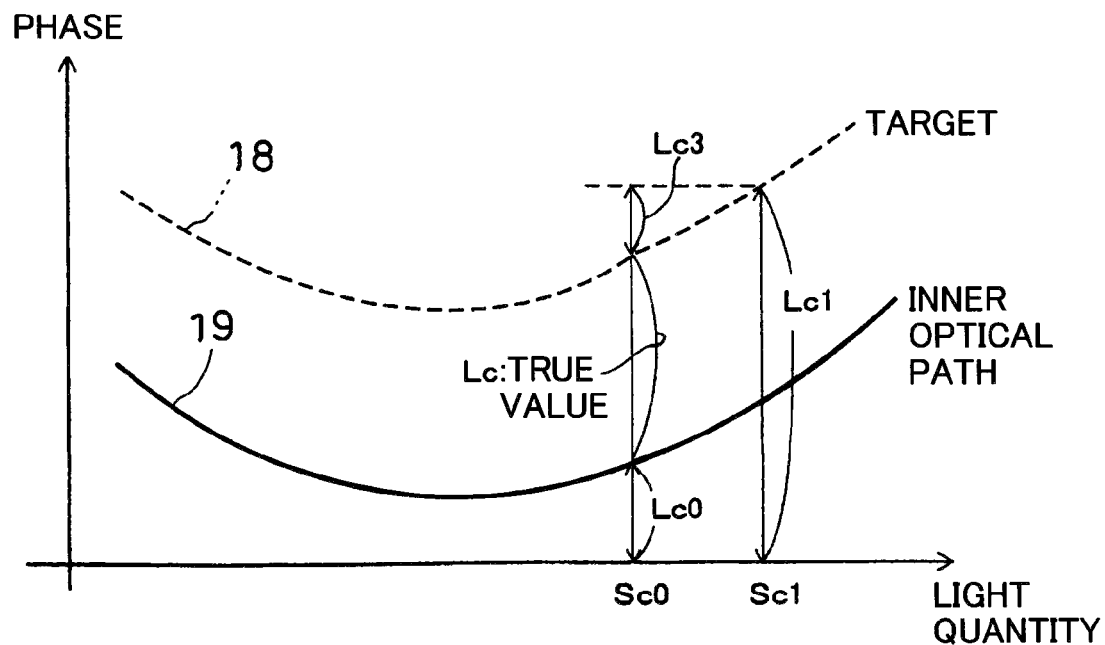
FIG. 6 is a diagram to show a relation between receiving light quantity (photodetection amount) and phase on an outer optical path and on an inner optical path of the electro-optical distance measuring device.
Figure 7:
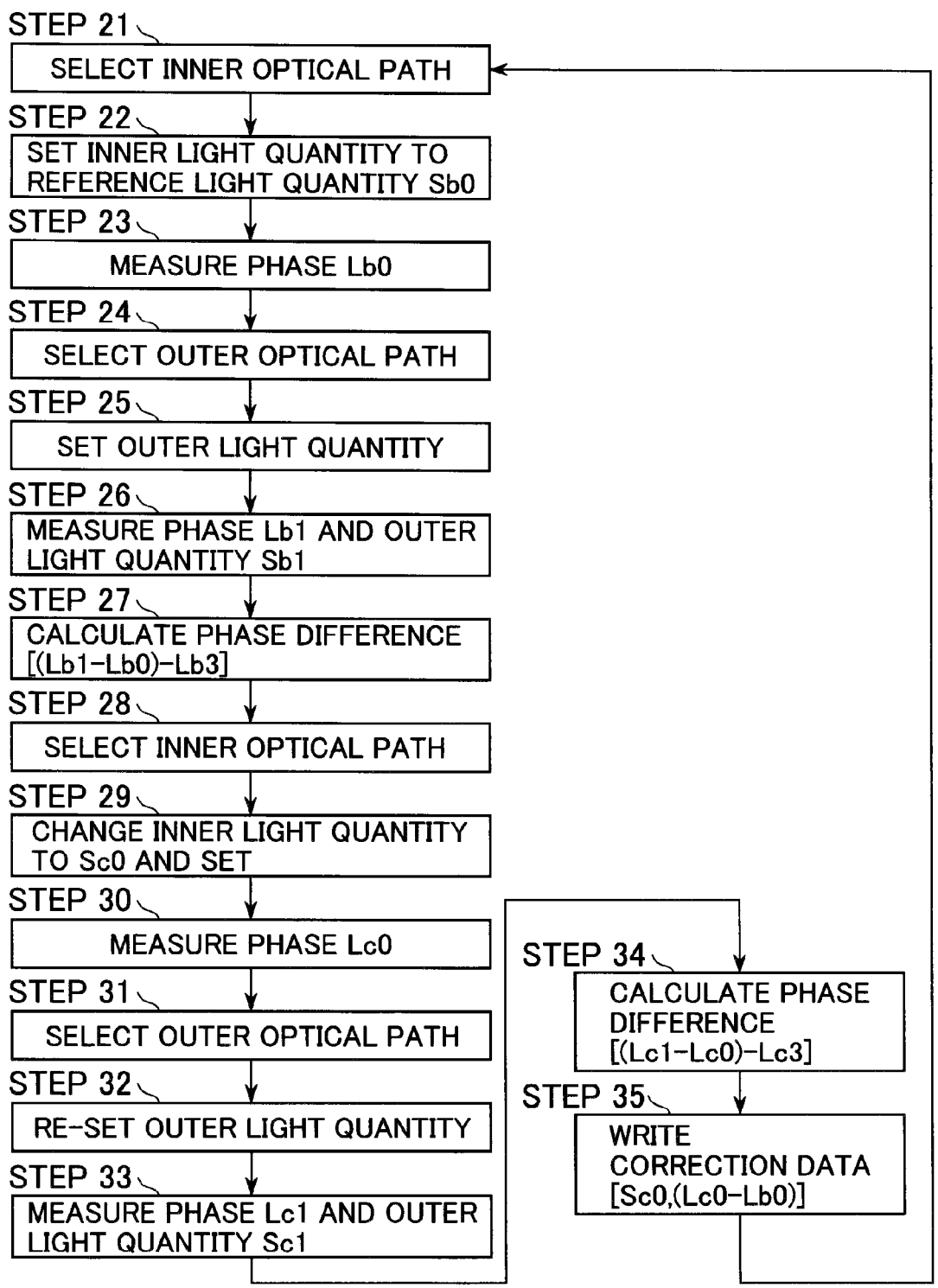
FIG. 7 is a flowchart to show updating of correction information of the electro-optical distance measuring device.
Figure 8:
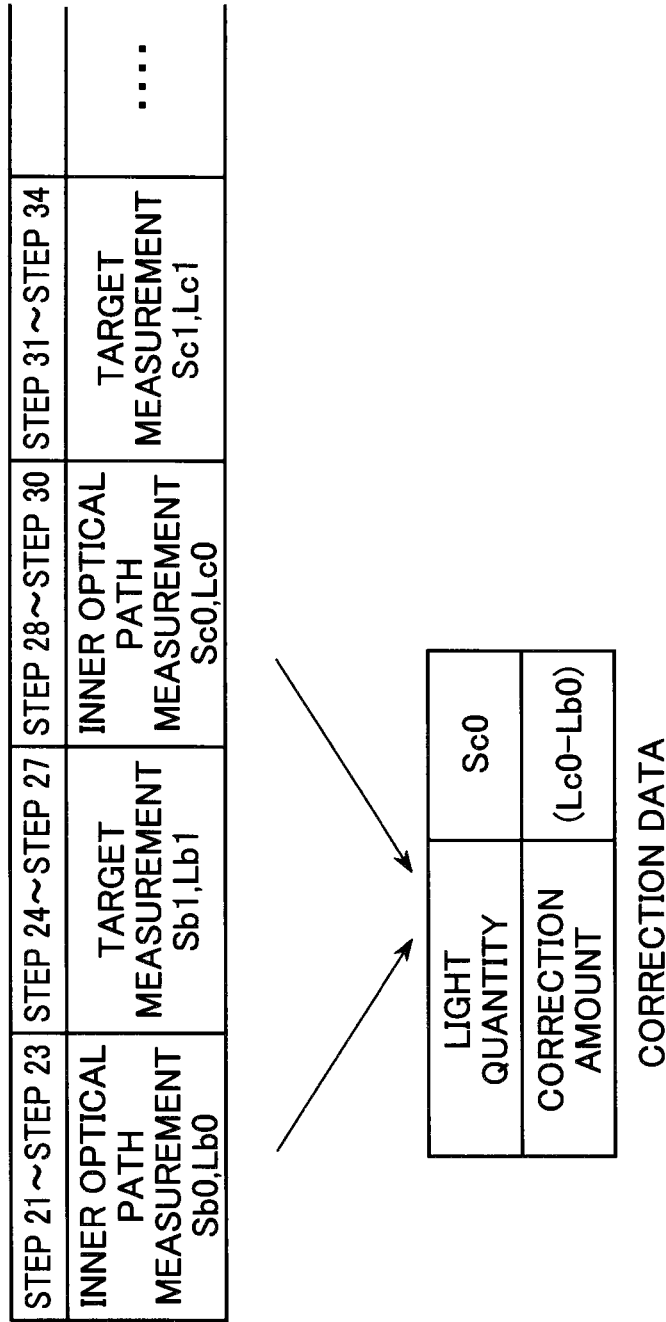
FIG. 8 is a time chart to show the measurement and updating of correction information when distance is measured by the electro-optical distance measuring device.

FIG. 5 and FIG. 6 each represents the relation between the receiving light quantity and the phase on the outer optical path 10 and the inner optical path 11. In the figures, the solid line curves 17 and 19 represent characteristics of the inner optical path 11 (inner reference optical path), and the broken line curves 16 and 18 represent characteristics of the outer optical path 10 (distance measuring optical path).

The photodetection circuit 7 and the photodetection element 8 are commonly shared by the outer optical path 10 and by the inner optical path 11. As a result, the curves 16 to 19 shown in FIG. 5 and FIG. 6 have the same configuration as curve of the correction information (the correction curve 15). Each of the curves 16 to 19 shown in FIG. 5 and FIG. 6 is in the same configuration in that the correction curve 15 is moved by parallel displacement in axial direction of the phase.

As described above, distance measuring operation of the electro-optical distance measuring device 1 is alternately changed over between the outer optical path 10 and the inner optical path 11 by the optical path changeover unit 12. The pulsed distance measuring light is projected to the object to be measured 2 via the outer optical path 10 for a predetermined period of time, and the inner reference light is projected for a predetermined period of time via the inner optical path 11 (Step 21).

The inner reference light (hereinafter referred as "inner light") projected to the inner optical path 11 is adjusted to the reference light quantity Sb0 by the inner light quantity adjusting means 14 similarly to the case of the acquisition of correction information at the time of starting, and a phase Lb0 of the inner optical path 11 at the reference light quantity Sb0 is determined (Step 22 and Step 23).

The optical path is changed over to the outer optical path 10 by the optical path changeover unit 12, and the pulsed distance measuring light is projected outward (hereinafter referred as "outer light") (Step 24). The outer light is reflected by the object to be measured 2 and enters the photodetection element 8 via the outer light quantity adjusting means 13. The outer light quantity adjusting means 13 adjusts the light quantity of the incident outer light to the light quantity as measurable (Step 25). The adjusted outer light is received by the photodetection element 8. The photodetection signal issued from the photodetection element 8 is processed in the same manner as in the case of the inner light, and receiving light quantity Sb1 and the phase Lb1 to correspond to the receiving light quantity Sb1 are determined (Step 26).

If there is no difference in the light quantity between the reference light quantity Sb0 and the light quantity Sb1 of the reflection light, the phase difference (Lb1−Lb0) is simply the phase difference (time), which is caused when the light is projected to and returns from the target. When this phase difference is multiplied by a coefficient, which is obtained from the light velocity and reference frequency of electrical circuit, a distance to the object to be measured 2 can be determined.

In many cases, however, light quantity of the outer light is constantly changing due to the causes such as heat haze, and it is difficult to fix the outer light quantity to the same light quantity as that of the inner light quantity. For the purpose of determining the distance, in which errors caused by light quantity difference is not included, the light quantity of the outer optical path 10 must be equal to the light quantity of the inner optical path 11.

In case there is a difference in the light quantity between the reference light quantity Sb0 and the light quantity Sb1 of the outer light, a correction amount to the phase Lb1 as obtained by the light quantity Sb1 is determined by using the correction information as already acquired, and the measured value is corrected.

The phase Lb1 as obtained on the outer optical path 10 is a value determined when the light quantity is Sb1. In FIG. 5, if it is supposed that the measurement is made when the outer light quantity is Sb0, from the curve 16 including the phase Lb1 (a curve obtained by displacing the correction curve 15 in parallel), the measured values must be lower than Lb1 by the value of the phase Lb3.

It is supposed here that the light quantity is x and the phase is y, and that the correction information is expressed by the function y=f(x). Then, correction amount (phase difference) Lb3 can be given by the following equation (1):

$$Lb3 = [f(Sb1) - f(Sb0)]\qquad\text{Equation (1)}$$

Therefore, a distance D to the object to be measured 2 as corrected according to the correction information is expressed by the equation (2) as given below (Step 27). The distance D thus obtained is displayed on the display unit 9 such as a monitor.

$$D = [(Lb1 - Lb0) - Lb3] \times k \qquad \text{Equation (2)}$$
$$= [(Lb1 - Lb0) - (f(Sb1) - f(Sb0))] \times k$$

where k is a constant to convert the phase to distance.

Next, description will be given on the operation to acquire and to update correction data.

By the optical path changeover unit 12, the optical path is changed to the inner optical path 11 (Step 28). The inner light quantity is changed by the inner light quantity adjusting means 14. The inner light quantity is adjusted to the light quantity Sc0 (Step 29), and a phase Lc0 to correspond to the light quantity Sc0 is determined (Step 30). By the optical path changeover unit 12, the outer optical path 10 is selected (Step 31), and the outer light quantity is adjusted to Sc1 by the outer light quantity adjusting means 13 (Step 32). Light quantity of the outer light quantity Sc1 is measured, and phases Lc1 and Sc1 to correspond to the outer light quantity Sc1 are determined (Step 33).

By the procedure similar to the one as described above, Lc0 of the inner optical path 11 and Lc1 of the outer optical path 10 are obtained. Based on the inner optical path 11, the value of Lc3 is determined, and further, phase difference [(Lc1–Lc0)–Lc3] is obtained (Step 34).

Here, the distance D can be obtained by the procedure similar to the one as described above by the equation (3):

$$D=[(Lc1-Lc0)-(f(Sc1)-f(Sc0))] \times k \qquad \text{Equation (3)}$$

Meanwhile, the phase change (Lc0–Lb0), which is given by the phase Lc0 on the inner optical path 11 with the light quantity Sc0 and by the phase Lb0 of the inner optical path 11 with the reference light Sb0 shown in FIG. 5, must be the phase change in case of the light quantity Sc0. Thus, the phase change (Lc0–Lb0) is combined with the light quantity Sc0 as one set (one correction data), and the one correction data is written in the storage unit 4. As a result, the correction information stored in the storage unit 4 can be updated by an extent of one data (Step 35).

The written data are sequentially overwritten from the oldest correction data stored in the storage unit 4, and updating is carried out sequentially from old correction data.

By carrying out the procedure of distance measurement with the updating of the correction data at the same time, the correction data can be acquired repeatedly while changing the inner light quantity over the total light quantity level, and the correction information can be constantly updated by continuing the writing. That is, the updating of the correction information and the distance measurement can be performed at the same time.

Now, referring to FIG. 9 to FIG. 18, description will be given on the second embodiment of the present invention.

First, referring to FIG. 9 and FIG. 10, description will be given on general features of a distance measuring system where the electro-optical distance measuring device of the second embodiment is applied.

Figure 9:
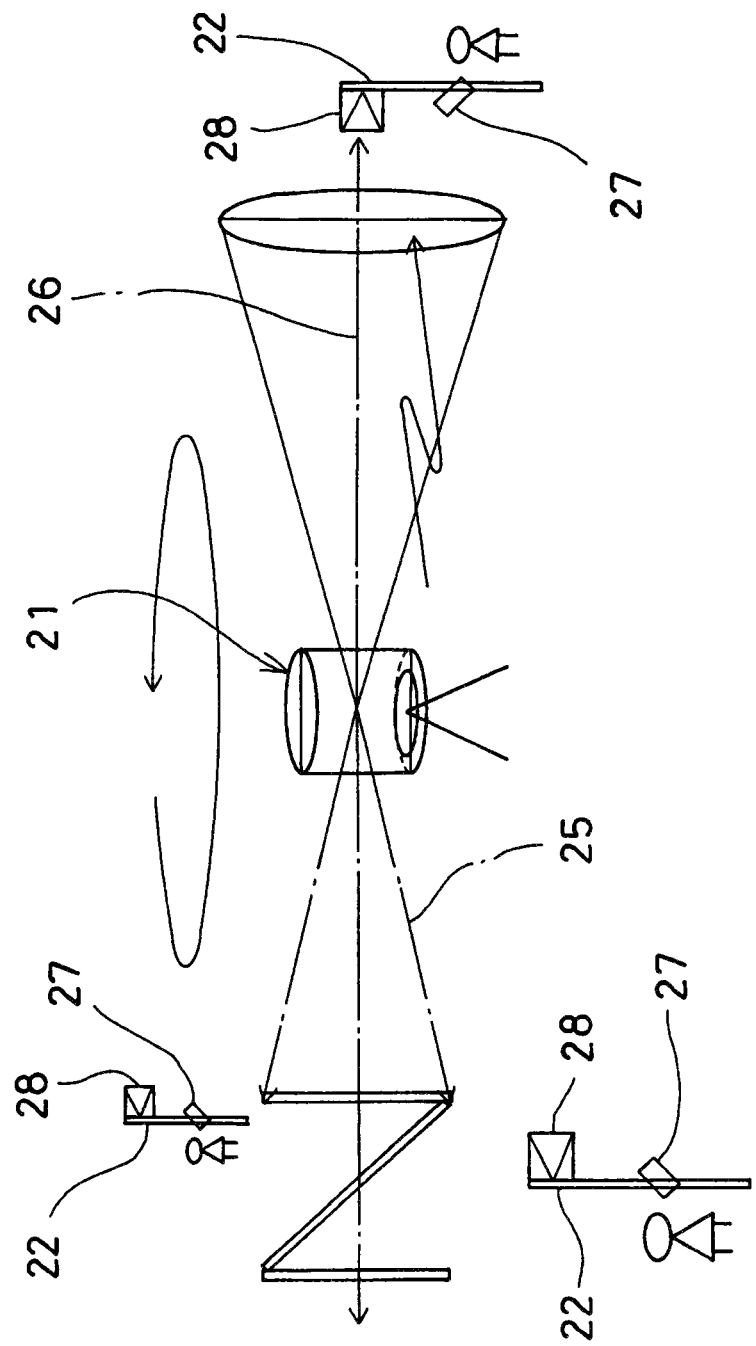
FIG. 9 is a drawing to explain general features of a distance measuring system using an electro-optical distance measuring device according to a second embodiment of the present invention.
Figure 10:
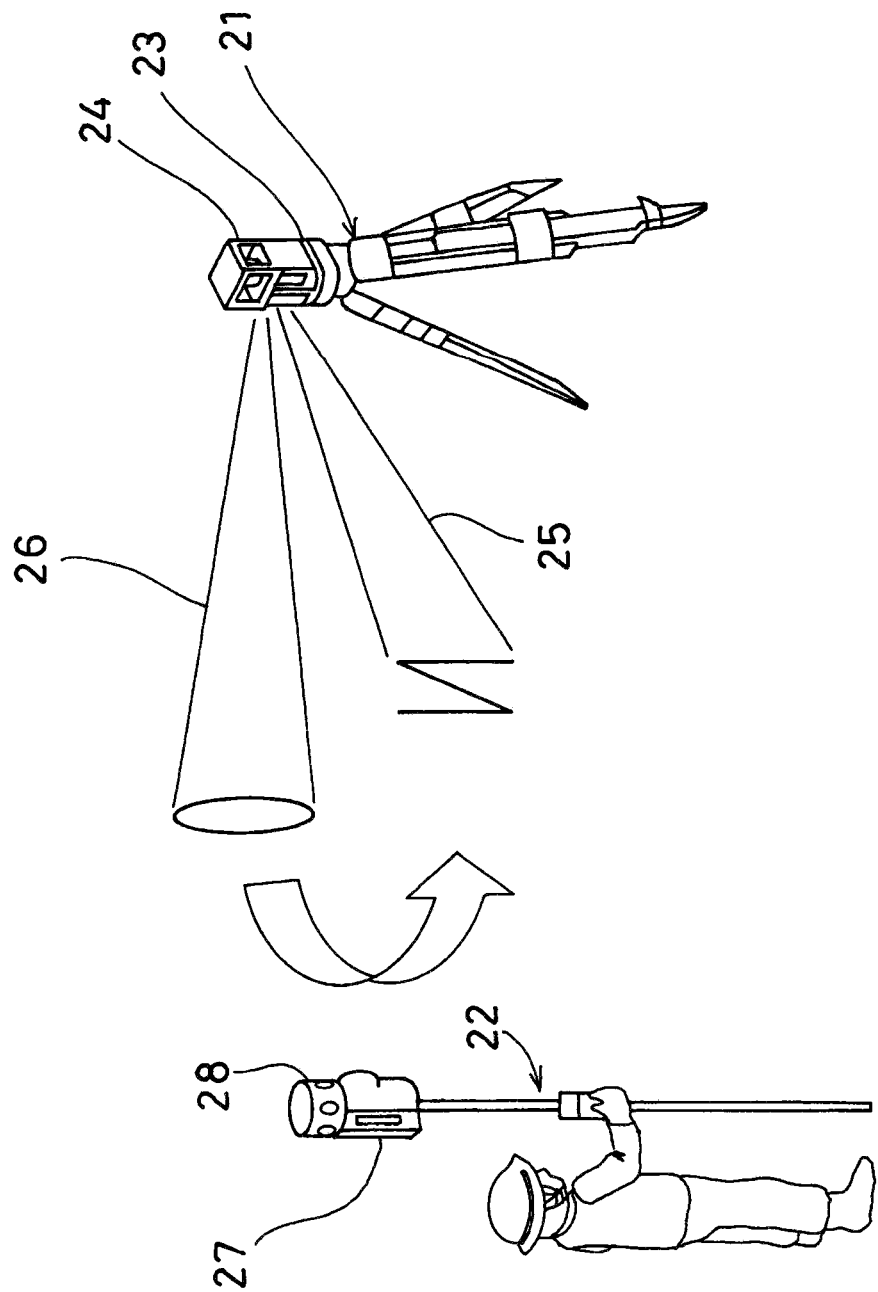
FIG. 10 is a drawing to explain a relation between the electro-optical distance measuring device and an object to be measured.

By the electro-optical distance measuring device 21 as shown in FIG. 9 and FIG. 10, it is possible to prepare a horizontal reference plane and to measure a distance to the object to be measured 22.

The electro-optical distance measuring device 21 comprises a reference plane forming unit 23 and a distance measuring unit 24. The electro-optical distance measuring device 21 is installed at a known point and projects a laser beam 25 for forming reference plane (which is a continuous light), at constant velocity for rotary irradiation, and it is possible to project a distance measuring light 26 (which is a pulsed light) for rotary irradiation. By receiving the distance measuring light 26 reflected from the object to be measured 22, a distance to the object to be measured 22 from a plurality of points can be measured. The laser beam 25 for forming reference plane and the distance measuring light 26 can be independently projected for rotary irradiation, or the laser beam 25 for forming reference plane is projected for rotary irradiation prior to the projection of the distance measuring light 26.

The reference plane forming unit 23 forms a horizontal reference plane by projecting the laser beam 25 for forming the reference plane, which includes two or more fan-shaped laser beams with at least one of the fan-shaped laser beams tilting (in the figure, it is shown as three fan-shaped laser beams with N-shaped cross-section of luminous fluxes) at constant velocity for rotary irradiation. An electro-optical distance measuring device, which projects three or more fan-shaped laser beams with one of the fan-shaped laser beams tilting is disclosed in JP-A-2004-212058 (the Patent Document 2).

The laser beam 25 for forming reference plane is projected for rotary irradiation. The object to be measured 22 comprises a photodetection device 27 and a prism 28. By obtaining time difference at the time of light receiving when the photodetection device 27 receives two or more fan-shaped laser beams, an elevation angle with respect to the horizontal reference plane with the electro-optical distance measuring device 21 at the center can be obtained from the time difference and from tilt angle of the tilted fan-shaped laser beam. Based on the elevation angle, a tilted reference plane can be set up.

The reference plane forming unit 23 has a projecting direction detector (not shown) to detect rotation angle of the laser beam 25 for forming reference plane in projecting direction. When the laser beam 25 for forming reference plane passes the object to be measured 22, the projecting direction detector receives the laser beam 25 for forming reference plane as reflected by the prism 28. From a rotation angle detected by the projecting direction detector at the time of light receiving, a direction of the object to be measured 22 can be detected.

A surveying system for projecting a laser beam for forming N-shaped reference plane for rotary irradiation and for projecting the distance measuring light 26 for rotary irradiation is disclosed in JP-A-2008-82895 (the Patent Document 3).

When the distance measuring unit 24 projects the distance measuring light 26 for rotary irradiation and projects the distance measuring light 26 only in the range where the light passes a plurality of the objects to be measured 22, distances to the plurality of the objects to be measured 22 can also be determined. Therefore, based on the measured elevation angle and the measured distance, a position in height direction of the object to be measured 22 can be determined.

Figure 11:
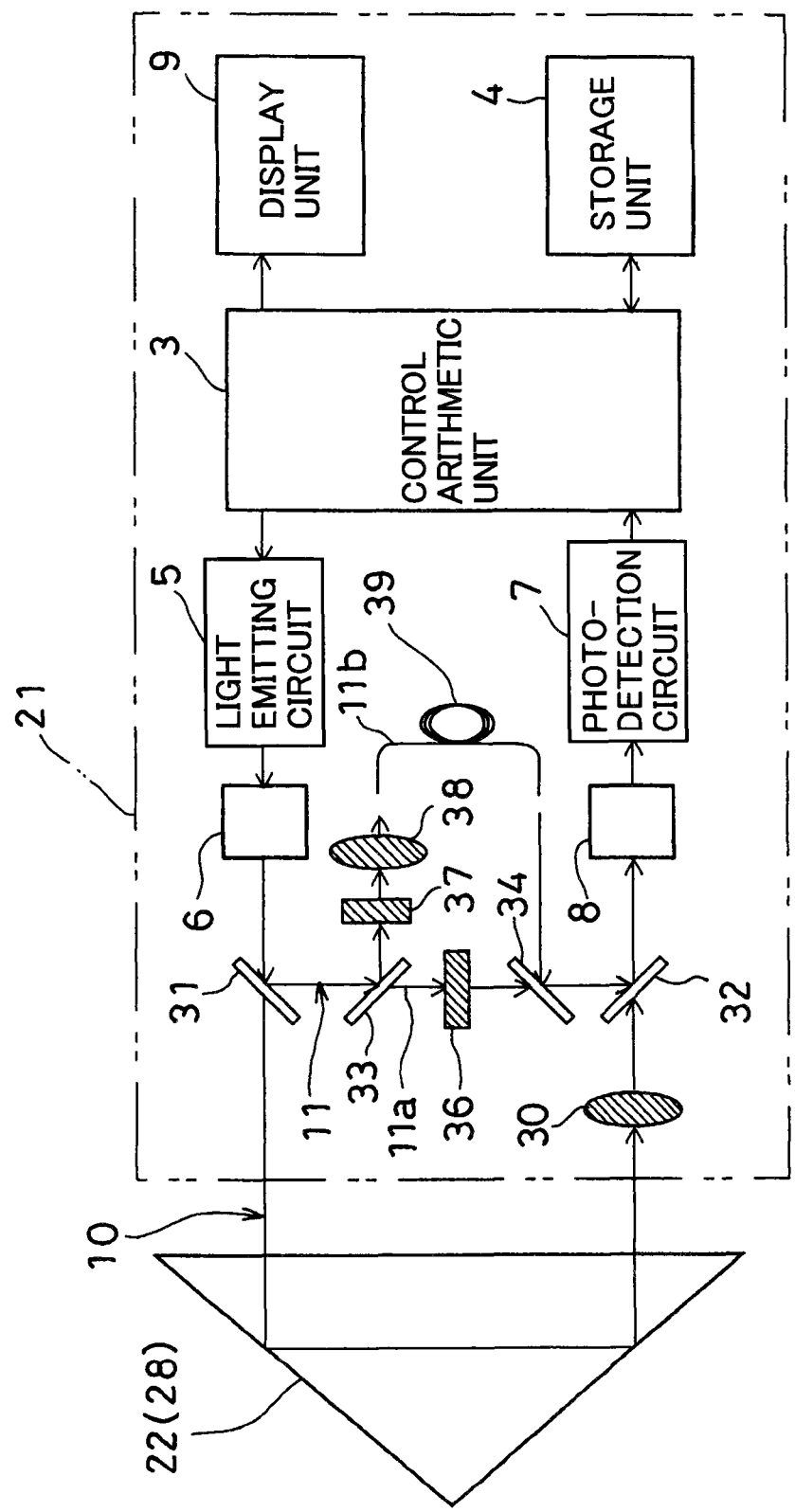
FIG. 11 is a schematical block diagram to show the second embodiment of the present invention.
Figure 12:
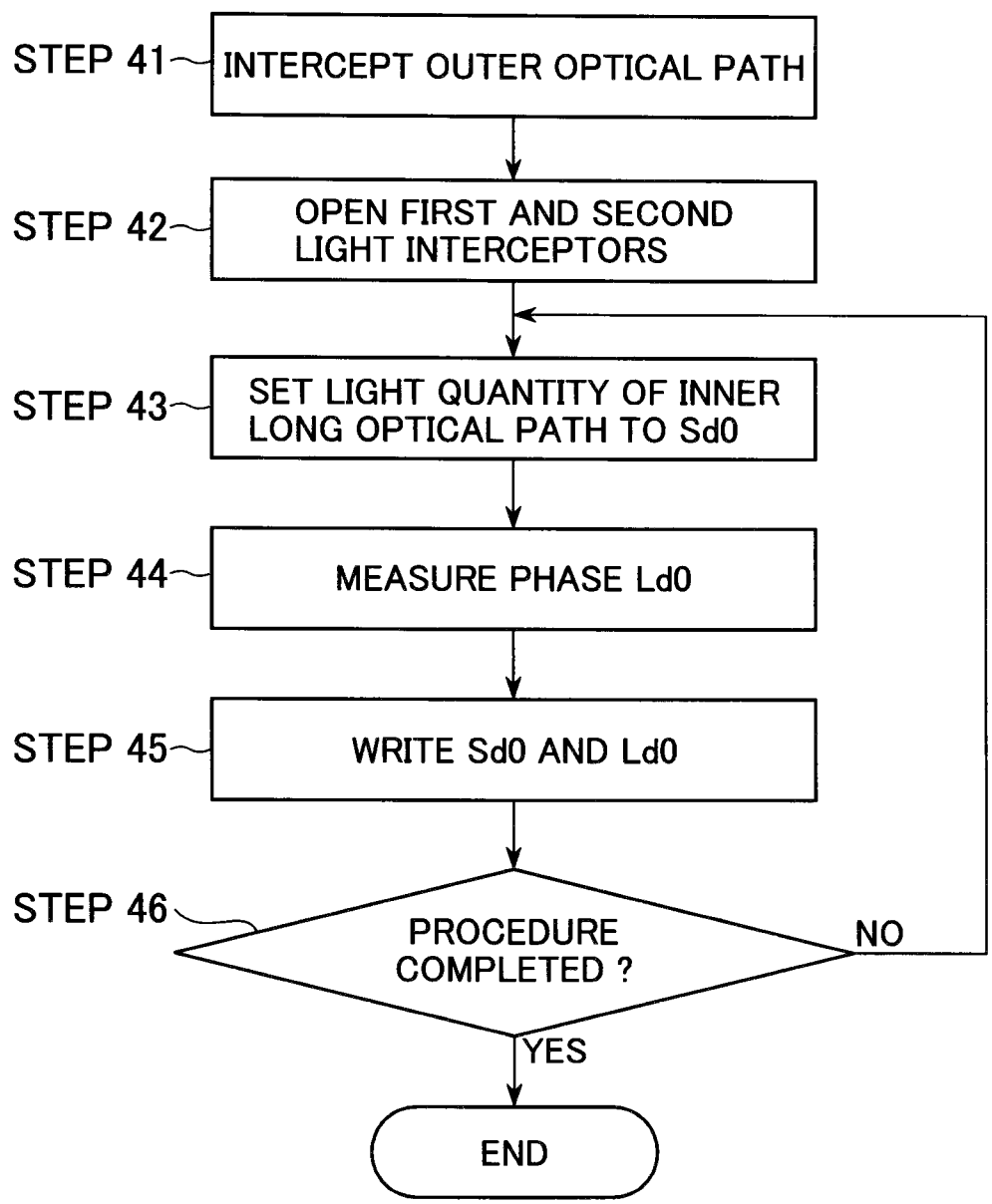
FIG. 12 is a flowchart to show acquisition of correction information in the second embodiment.
Figure 13:
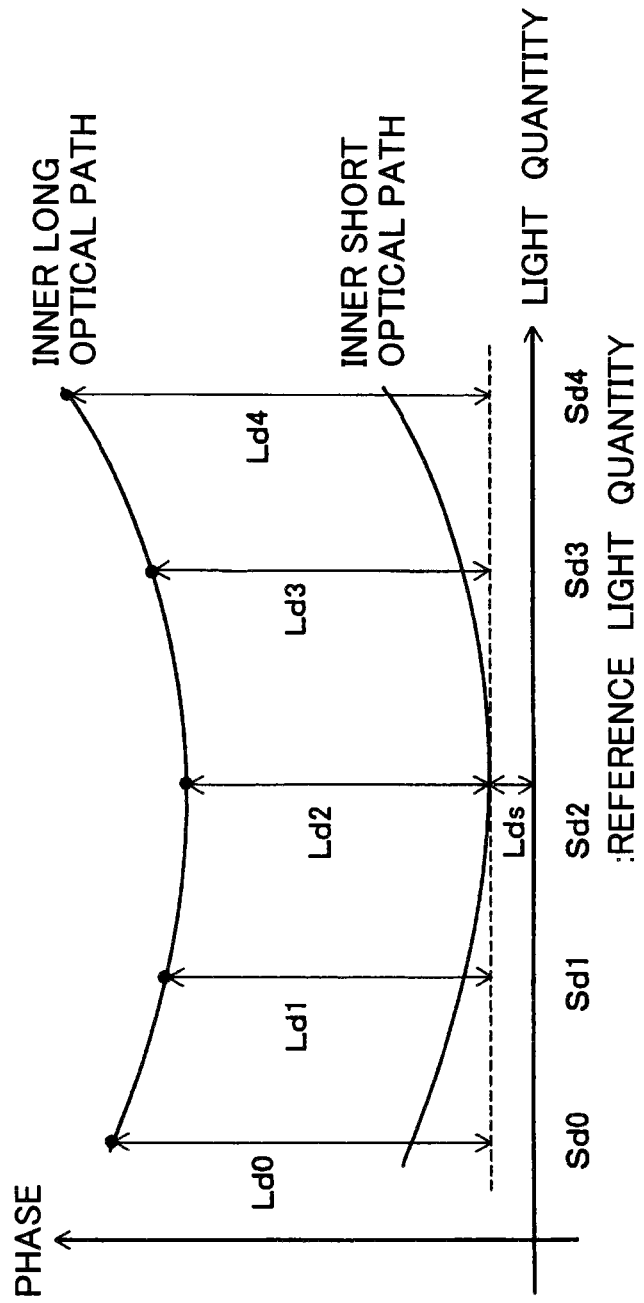
FIG. 13 is a diagram to show a relation between receiving light quantity (photodetection light quantity) and phases of an inner short optical path and an inner long optical path in the second embodiment.

FIG. 11 shows an approximate arrangement of the electro-optical distance measuring device 21. In FIG. 11, the same component as shown in FIG. 1 is referred by the same symbol, and detailed description is not given here.

An outer light emitted from the light emitting element 6 is projected along an outer optical path 10. The outer light is projected to the object to be measured 22 via the outer optical path 10, and a reflection light reflected by the object to be measured 22 enters a photodetection element 8 via the outer optical path 10. On a return course of the outer optical path 10, there is provided a high speed diaphragm 30, which serves as optical path adjusting means and also as optical path opening and closing means. The high speed diaphragm 30 adjusts light quantity of the reflection light to enter, and the high speed diaphragm 30 opens or intercepts the optical path.

A first half-mirror 31, serving as optical path splitting means, is disposed on an outgoing route of the outer optical path 10, and a second half-mirror 32, serving as optical path combining means, is arranged on the return route of the outer optical path 10. The outer optical path 10 is split to the inner optical path 11 by the first half-mirror 31 and the inner optical path 11 is combined with the return route of the outer optical path 10 by the second half-mirror 32.

On the inner optical path 11, there are provided a third half-mirror 33, serving as optical path splitting means, and a fourth half-mirror 34, serving as optical path combining means. By the third half-mirror 33, the optical path is split to an inner short optical path 11a and an inner long optical path 11b. On the inner short optical path 11a, a first light interceptor 36 is disposed, which can open or intercept the inner short optical path 11a.

On the inner long optical path 11b, there are provided a second light interceptor 37, a low speed diaphragm 38, serving as optical path adjusting means, and an optical fiber 39. The second light interceptor 37 opens or intercepts the inner long optical path 11b, and the low speed diaphragm 38 adjusts light quantity. The optical fiber 39 is disposed to maintain a predetermined optical length difference between the inner short optical path 11a and the inner long optical path 11b. For instance, the length of the optical fiber 39 is set to 130 m. The high speed diaphragm 30 is operated at higher speed than the low speed diaphragm 38, but its resolving power is lower.

Description will be given below on acquisition of correction information and distance measurement by the electro-optical distance measuring device 21.

In the second embodiment also, correction information is acquired to obtain phase characteristics when power is turned on. Then, after the correction information is updated, operation for distance measurement is started.

First, the laser beam 25 for forming reference plane is projected over total circumference (one turn). By receiving and detecting a reflection light, it is detected in which direction the objects to be measured 22 are located and how many objects there are. Then, the distance measuring light 26 is rotated, and the distance measuring light 26 is projected over a range where the objects to be measured 22 are present so that a reflection light from each of the objects to be measured 22 can be received, and approximate distance measurement is carried out. In the approximate distance measurement, it is enough if an approximate distance to the object to be measured 22 is determined. For instance, it is enough to find out whether a distance to the object to be measured 22 is longer or shorter than 50 m. Depending on the phase of the reflection light only, the distance is calculated.

When the approximate measurement on the object to be measured 22 is completed, distance measurement is performed on each object to be measured 22 by switching over between short distance measurement and long distance measurement based on the result of the approximate measurement. At the same time, correction data is acquired. By the correction data, the correction information is updated. The measured distance is corrected by the newest correction information, and distance measurement can be carried out at high accuracy.

Description will be given below on acquisition of correction information, updating of correction information, approximate distance measurement, short distance measurement, and long distance measurement.

Referring to FIG. 11 to FIG. 14, the acquisition of the correction information will be described.

As described above, the acquisition of the correction information is automatically performed when power is turned on to match the temperature change and the changes over time. For the operation to acquire correction information, only the inner optical path 11 is used.

The first light interceptor 36 and the second light interceptor 37 are set to an open status, and the high speed diaphragm 30 is set to a status where the optical path is intercepted (Step 41 and Step 42).

Based on a light emission instruction from the control arithmetic unit 3, the light emitting circuit 5 generates light emission timing. According to this light emission timing, the light emitting element 6, i.e. a pulsed laser diode, is driven, and a pulsed light is emitted from the light emitting element 6. In this case, light quantity of the pulsed light is set to a predetermined value.

The pulsed light is split by the first half-mirror 31. A part of the pulsed light is projected along the outer optical path 10 as an outer light, and a remaining part of the pulsed light is projected along the inner optical path 11 as an inner light. The inner light is further split by the third half-mirror 33. A part of the inner light is projected along the inner short optical path 11a, and the remaining part of the inner light is projected along the inner long optical path 11b.

The pulsed light projected along the inner short optical path 11a passes the first light interceptor 36 in open status. Then, the pulsed light enters the photodetection element 8 via the fourth half-mirror 34 and the second half-mirror 32. The photodetection element 8 changes the received pulsed light to an electric signal and outputs the electric signal to the photodetection circuit 7. After performing signal processing such as AD conversion, sample & hold, etc., the photodetection circuit 7 inputs the electric signal to the control arithmetic unit 3. Light quantity of the pulsed light projected along the inner short optical path 11a is a reference light quantity $Sd2$ as the light quantity is adjusted in the manufacturing process.

After being split by the third half-mirror 33 and being projected along the inner long optical path 11b, the pulsed light passes the second light interceptor 37 in open status, and the pulsed light is adjusted to the light quantity $Sd0$ by the low speed diaphragm 38 (Step 43).

The pulsed light thus adjusted passes through the optical fiber 39, the fourth half-mirror 34, and the second half-mirror 32 and enters the photodetection element 8. The photodetection element 8 changes the received pulsed light to an electric signal and outputs the electric signal to the photodetection circuit 7. The photodetection circuit 7 performs signal processing such as AD conversion, sample & hold, etc. on the electric signal, and inputs the electric signal to the control arithmetic unit 3.

The distance measuring light reflected by the object to be measured 22 is intercepted by the high speed diaphragm 30. This is to avoid the influence of sunlight or influence from reflectors located outside.

By the operation as described above, photodetection data of the inner short optical path 11a and the inner long optical path 11b can be acquired. The control arithmetic unit 3 calculates phase difference $Ld0$ between the inner short optical path 11a and the inner long optical path 11b (Step 44). Then, the light quantity $Sd0$ and the phase difference $Ld0$ of the inner long optical path 11b are combined in a set and are stored in the storage unit 4 (Step 45).

Opening (aperture) of the low speed diaphragm is changed. Light quantity received by the photodetection element 8 is changed to $Sd1$, $Sd2$, $Sd3$ and $Sd4$. The phase differences $Ld1$, $Ld2$, $Ld3$ and $Ld4$ are obtained on the light quantities $Sd1$, $Sd2$, $Sd3$ and $Sd4$ respectively. Each of the light quantities and the phase differences is combined together in a set and is written in the storage unit 4 (Step 45).

The value obtained by this procedure is a phase difference between the two optical paths when light quantity on the inner long optical path 11b is changed with the light quantity of the inner short optical path 11a fixed to the reference light quantity Sd2. That is, this indicates the relation between the light quantity and the phase change characteristics. Therefore, if it is supposed that the range of the change of the light quantity is set to total light quantity, correction information to match the total light quantity level can be stored in the storage unit 4.

Further, in the second embodiment, the phase is determined at the same time on two inner optical paths. Therefore, the change of electrical conditions is very low, and correction information with a higher accuracy can be acquired.

Next, description will be given on updating of the correction information.

The phase characteristics are changing constantly because of the changes of environmental temperature or self-heating inside the equipment. Accordingly, it is necessary to continuously update the correction information during the measuring operation.

In FIG. 11, the high speed diaphragm 30 is set to light intercepting condition, and the first light interceptor 36 and the second light interceptor 37 are opened. At the same time, the low speed diaphragm 38 is operated slightly, and the light quantity on the inner long optical path 11b is changed. Then, a pulsed light is emitted from the light emitting element 6.

The pulsed light is split to three optical paths, i.e. to the outer optical path 10, the inner short optical path 11a, and the inner long optical path 11b. Because the outer optical path 10 is shut off by the high speed diaphragm 30, only the inner light, which has passed the inner short optical path 11a and the inner long optical path 11b, enters the photodetection element 8.

Based on the result of photodetection, the control arithmetic unit 3 calculates a phase difference between the inner long optical path 11b and the inner short optical path 11a. By combining with the data of the inner long optical path 11b, the correction information stored in the storage unit 4 is updated by an extent of one correction data.

This updating procedure is performed during the time period when the main unit makes one turn. In the next cycle, the low speed diaphragm 38 is operated to change the light quantity of the inner long optical path 11b, and the correction data is updated by an extent of one correction data. By repeating this operation, the correction information can be continuously updated.

Now, description will be given on distance measuring operation of the electro-optical distance measuring device 21 in the second embodiment.

By the electro-optical distance measuring device 21, photodetection signals are obtained from the outer light entering via the outer optical path 10 and from two inner lights entering via the inner short optical path 11a and the inner long optical path 11b respectively. The two inner lights are alternately selected by intercepting operation of the first light interceptor 36 and the second light interceptor 37, and one of the two inner lights is used for distance measurement.

However, the timing to receive the outer light and the inner light by the photodetection element 8 is closer to each other, and two signals may not be separated well or error may occur due to the influence exerted mutually by the signals. In this respect, in the second embodiment, an approximate distance to the object to be measured 22 is determined at first and it is selected which of the inner short optical path 11a or the inner long optical path 11b should be selected according to the approximate distance obtained, and the distance is measured by using the inner optical path 11 and the outer optical path 10 selected.

First, referring to FIG. 11, description will be given on the measurement of the approximate distance.

Prior to the distance measurement, the laser beam 25 for forming reference plane is projected by rotary irradiation. A reflection light from the object to be measured 22 is received, and position information of the object to be measured 22 is acquired. Based on the position information thus acquired, a pulsed light is emitted from the light emitting element 6 at a position where the distance measuring light 26 collimates the object to be measured 22.

Or, the projecting direction of the laser beam 25 for forming reference plane is rotated in horizontal direction prior to the distance measuring light 26. Then, a reflection light of the laser beam 25 for forming reference plane is received and the object to be measured 22 is detected, and the pulsed light is emitted from the light emitting element 6 at the position of the object to be measured 22.

The pulsed light is split to the outer optical path 10 and to the inner optical path 11 by the first half-mirror 31. When the approximate distance is measured, the inner short optical path 11a and the inner long optical path 11b are intercepted by the first light interceptor 36 and the second light interceptor 37. Also, the high speed diaphragm 30 is set in totally opened status.

The outer light projected along the outer optical path 10 is reflected by the object to be measured 22, and the outer light reaches the photodetection element 8 via the high speed diaphragm 30 and the second half-mirror 32. In this case, the high speed diaphragm 30 is set in totally opened status under the assumption that the reflection light from the object to be measured 22 may be slight and weak.

The inner light projected along the inner optical path 11 is split to the inner short optical path 11a and the inner long optical path 11b by the third half-mirror 33. However, the light is intercepted along the inner short optical path 11a and the inner long optical path 11b by the first light interceptor 36 and the second light interceptor 37 respectively, and the inner light does not reach the photodetection element 8.

Therefore, the control arithmetic unit 3 measures the distance only according to the outer light, and the approximate distance to the object to be measured 22 is determined.

When the approximate distance to the object to be measured 22 is determined, either the inner short optical path 11a or the inner long optical path 11b is selected according to the result of the measurement, and precise measurement can be carried out.

Description will be given below on a case where the approximate distance to the object to be measured 22 is a short distance.

FIG. 15(A) shows photodetection signals when light is received by the photodetection element 8 via the inner optical path 11 when the pulsed light is emitted from the light emitting element 6 with the first light interceptor 36 and the second interceptor 37 in open status. Optical path length is different between the inner short optical path 11a and the inner long optical path 11b by an extent of the size of the optical fiber 39, and when the light passes along the inner long optical path 11b, the photodetection signal is delayed by a time period corresponding to the inner long optical path 11b, i.e. it is delayed by the phase Lf1.

When the object to be measured 22 is at a short distance, the inner short optical path 11a is intercepted by the first light interceptor 36.

FIG. 15(B) represents the conditions to generate a photodetection signal of the reflection light from the object to be measured 22 and a photodetection signal of the inner light reaching via the inner long optical path 11b.

When the object to be measured 22 is at a short distance, the reflection light from the object to be measured 22 is received first. Then, the inner light via the inner long optical path 11b is received and the photodetection signals are separated from each other.

Figure 16:
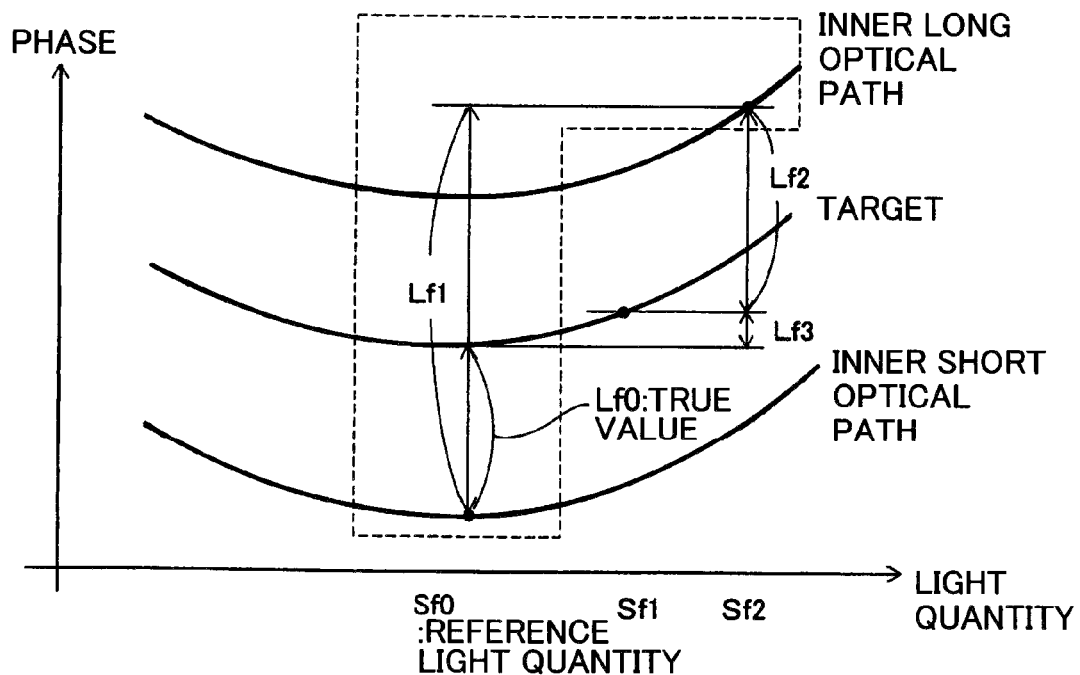
FIG. 16 is a diagram to show phase characteristics of the outer optical path, the inner short optical path, and the inner long optical path at the time of short distance measurement in the second embodiment.

FIG. 16 is a diagram to show relationship between the light quantity and the phase. In this diagram, curves to represent phase characteristics of the outer optical path 10, the inner short optical path 11a and the inner long optical path 11b are shown. Because the photodetection system is commonly shared in all of the optical paths, these curves are drawn in the same configuration as the curve of the correction information already acquired. Therefore, these curves can be obtained by parallel displacement of the correction information in phase direction.

In the following, description will be given on the assumption that the light quantity of the inner short optical path 11a is Sf0, the light quantity of the inner long optical path 11b is Sf2, and the phase difference between these two optical paths is Lf1 in the updating of the correction information of the same cycle.

When the short distance measurement is performed, opening (aperture) of the high speed diaphragm 30 is changed according to the information acquired when the same object to be measured 22 is measured at first, and the result is roughly aligned with the light quantity level as measurable.

The first light interceptor 36 is closed, and the second light interceptor 37 is opened. In this case, the low speed diaphragm 38 is not operated. When these operations have been completed, the pulsed light is emitted from the light emitting element 6.

The pulsed light is split to the outer optical path 10 and the inner optical path 11 by the first half-mirror 31. The inner optical path 11 is further split to the inner short optical path 11a and the inner long optical path 11b by the third half-mirror 33. On the other hand, the light to the inner short optical path 11a is intercepted by the first light interceptor 36, and only the pulsed light passing via the outer optical path 10 and the inner long optical path 11b reaches the photodetection element 8. The light quantity of the light passing via the inner long optical path 11b concurs with the light quantity Sf2 in the updating step of the correction information because the low speed diaphragm 38 is not operated.

Here, if it is supposed that the light quantity of the outer optical path 10 is the light quantity Sf1, phase difference between the outer optical path 10 and the inner optical path 11 corresponds to the phase difference Lf2.

If there is no difference in the light quantity between the outer light passing via the outer optical path 10 and the inner light passing via the inner long optical path 11b, the phase difference (Lf1–Lf2) is the phase difference to the object to be measured 22. When this phase difference is multiplied by light velocity and a coefficient k, which is obtained from reference frequency of the photodetection circuit 7, the distance can be determined.

In many cases, however, the light quantity of the outer light is continuously changing due to the causes such as heat haze (shimmering), and it is difficult to fix the light quantity of the inner light and the light quantity of the outer light on the same level. The high speed diaphragm 30 has lower resolving power because the high speed diaphragm 30 must be operated at high speed. The difference between the light quantity of the outer light and the light quantity of the inner light is more likely to occur from the viewpoint of the characteristics of the high speed diaphragm 30 as given above.

In the present embodiment, the correction amount is determined as described below, and correction is performed.

For the purpose of obtaining a distance, which does not include error caused by the difference of light quantity, the light quantity of the outer light must be equal to the light quantity of the inner light. The phase difference Lf2 between the inner long optical path 11b and the outer optical path 10 is determined when the light quantity of the outer optical path 10 is Sf1. If this light quantity is determined when the light quantity of the inner short optical path 11a is the same as the reference light quantity Sf0, the phase difference should be higher by an extent of Lf3. This is because the change of phase characteristics when the light quantity is changed is the same as the correction information acquired previously.

When the light quantity is represented by the symbol x, and the phase is represented by the symbol y, and the correction information is expressed by the function: $y=f(x)$, the correction amount Lf3 can be obtained as follows:

$$Lf3 = f(Sf1) - f(Sf0)$$

Therefore, a distance D to the object to be measured 22 can be expressed as:

$$D = [Lf1 - (Lf2 + Lf3)] \times k$$
$$= [Lf1 - (Lf2 + (f(Sf1) - f(Sf0)))] \times k$$

By the operation procedure as given above, a distance to the object to be measured 22 located at a short distance can be determined.

Figure 17:
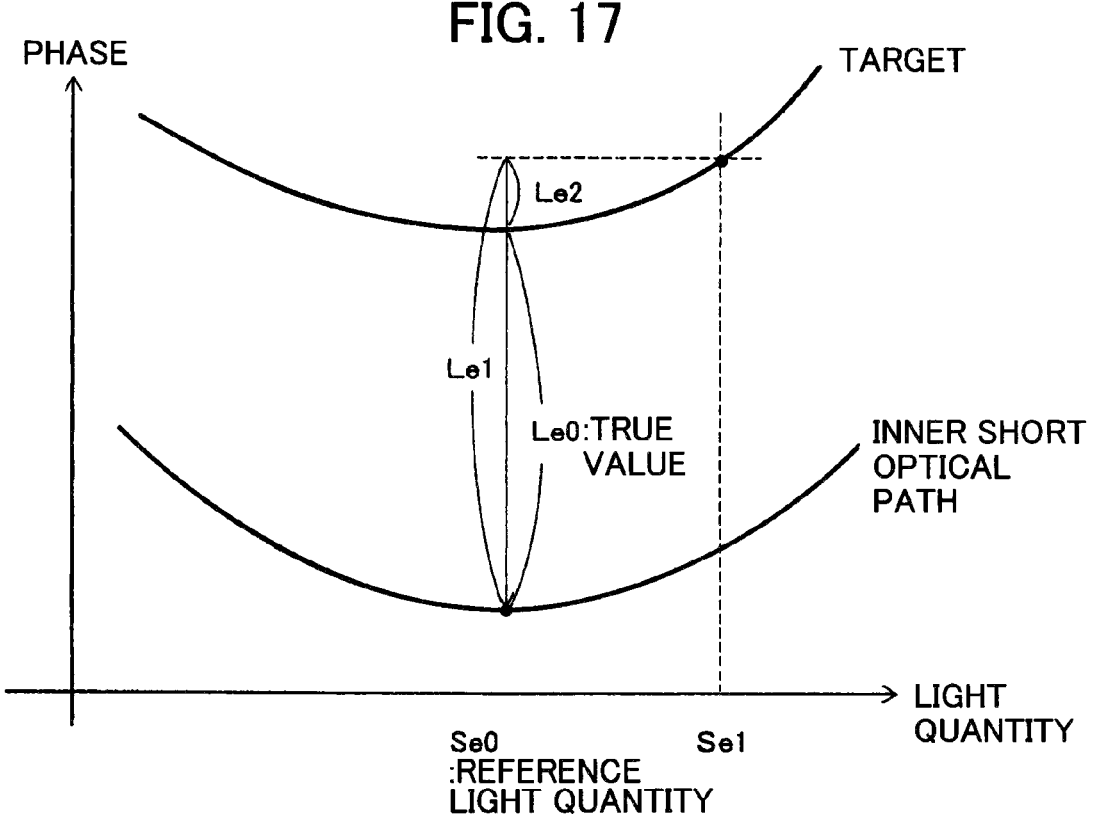
FIG. 17 is a diagram to show phase characteristics of the inner short optical path and the inner long optical path at the time of long distance measurement in the second embodiment.
Figure 18:
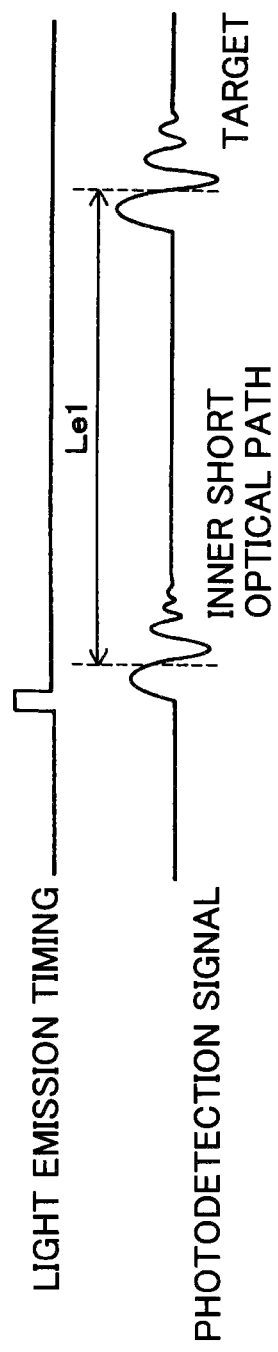
FIG. 18 is a time chart to show a relation between light emission timing and each photodetection signal of the outer optical path and of the inner short optical path at the time of long distance measurement in the second embodiment.
Figure 19:
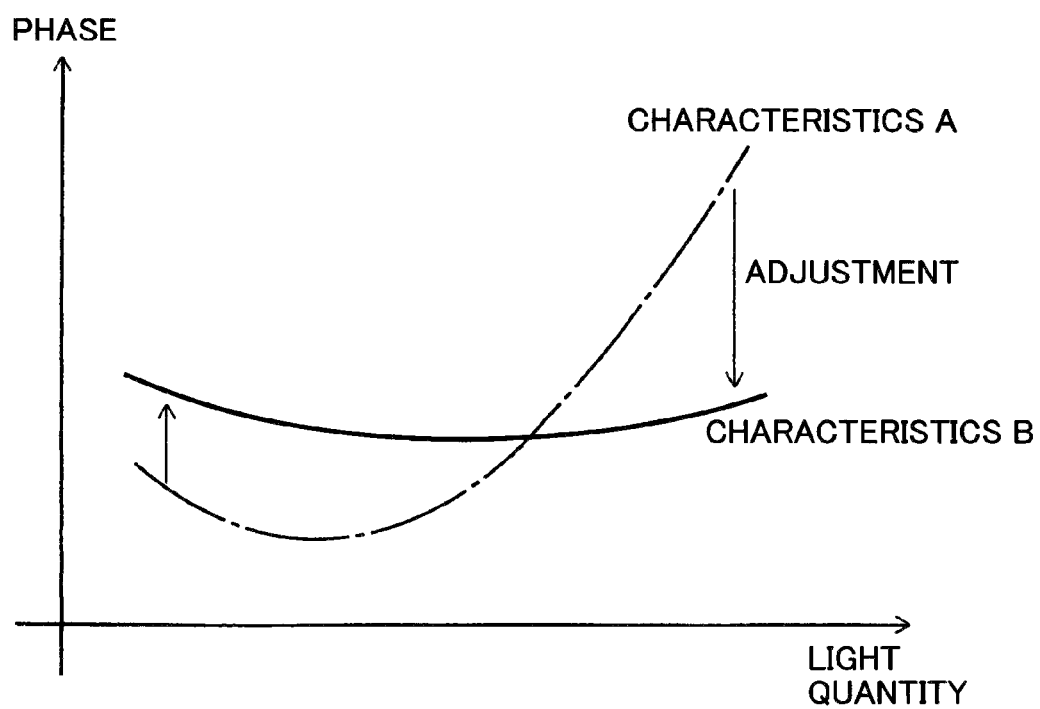
FIG. 19 shows phase characteristics of light receiving system (photodetection system) in a conventional type electro-optical distance measuring device. In the figure, symbol A represents phase characteristics of a photodetection circuit under non-adjustment condition, and symbol B represents phase characteristics after adjustment.

Next, referring to FIG. 17 and FIG. 18, description will be given on a case where the approximate distance to the object to be measured 22 is a long distance.

When the long distance measurement is performed, the opening (aperture) of the high speed diaphragm 30 is changed according to the information acquired when the same object to be measured 22 is measured, and the opening (aperture) is roughly aligned with the level of the light quantity as measurable.

The second light interceptor 37 is closed, and the first light interceptor 36 is opened. In this case, the low speed diaphragm 38 is not operated. When these operations have been completed, the pulsed light is emitted from the light emitting element 6.

The pulsed light is split to the outer optical path 10 and the inner optical path 11 by the first half-mirror 31, and the inner optical path 11 is further split to the inner short optical path 11a and the inner long optical path 11b by the third half-mirror 33.

Because the inner long optical path 11b is intercepted by the second light interceptor 37, only the pulsed light passing via the outer optical path 10 and the inner short optical path 11a reaches the photodetection element 8. The light quantity of the inner short optical path 11a is adjusted in the manufacturing process, and the light quantity of the inner short optical path 11a is equal to the reference light quantity Se0.

Here, if it is supposed that the light quantity of the outer light is the light quantity Se1, the phase difference between the outer optical path 10 and the inner short optical path 11a corresponds to the phase difference Le1.

If there is no difference in the light quantity between the outer optical path 10 and the inner optical path 11, a value of Le1 is the phase difference to the target. When the phase difference Le1 is multiplied by light velocity and by a coefficient k, which is obtained from reference frequency of the photodetection circuit 7, the distance can be determined.

However, the light quantity of the outer light is constantly changing as described above, and difference of the light quantity occurs with respect to the inner light. Therefore, correction is carried out as given below so that the light quantity of the outer light will be equal to the light quantity of the inner light.

The phase difference Le1 between the outer optical path 10 and the inner short optical path 11a is determined when the light quantity of the outer optical path 10 is Se1. If it is supposed here that this light quantity is determined when it is on the same level as the reference light quantity Se0 as the reference light quantity of the inner short optical path 11a, the phase difference should be lower by an extent of Le2. This is because the change of the phase characteristics when the light quantity is changed is the same as the correction information acquired previously.

It is supposed that the light quantity is represented by the symbol x, and the phase is represented by the symbol y, and that the correction information is given by the function: $y=f(x)$. Then, the correction amount Le2 can be given as:

$$Le2 = f(Se1) - f(Se0)$$

Therefore, a distance D to the object to be measured 22 is expressed as:

$$D = (Le1 - Le2) \times k$$
$$= [Le1 - (f(Se1) - f(Se0))] \times k$$

By the operation procedure as given above, the distance to the object to be measured 22 located at a long distance can be determined.

As described above, according to the present embodiment, correction information is acquired on environmental conditions for the distance measurement and on the distance measuring device itself prior to the execution of the distance measurement. Further, correction information is acquired in parallel to the distance measurement, and the result of distance measurement is corrected according to the correction information acquired. As a result, superb effects as given below can be provided.

It is possible to design and produce a product, which can maintain stable and high accuracy not to be influenced by temperature change and or by the changes over time.

Because the components to require high electrical property, which may be easily influenced by temperature change, are not used, the manufacturing cost can be reduced.

In the past, the conditions to use the electro-optical distance measuring device have been limited because temperature change and the change of environment to use the device must be taken into account. According to the present invention, the correction information can be acquired at real time, and correction can be made adequately and dynamically to cope with temperature change and the changes of environment. As a result, the device can be used under various conditions in wider range.

The correction information is acquired by the electro-optical distance measuring device itself when power is turned on, and no adjustment is required in the manufacturing process. This means that complicated procedures for adjustment and preparation of facilities are not required, and the manufacturing cost can be decreased.

INDUSTRIAL APPLICABILITY

The present invention provides an electro-optical distance measuring method for projecting a light from a light source toward an object to be measured, for receiving a reflection light from the object to be measured at a photodetection unit, for receiving the light from the light source as an inner light via an inner optical path by the photodetection unit, and for measuring a distance to the object to be measured according to the result of photodetection of the reflection light and the inner light of the photodetection unit, wherein the method comprises a correction information acquiring step for acquiring the correction information based on the inner light, a storing step for storing the correction information acquired and a calculating step, wherein the calculating step is to obtain a correction value from the correction information based on the reflection light and the inner light and to calculate a distance from the correction value and the result of photodetection of the reflection light and the inner light of the photodetection unit. As a result, the correction information can be acquired by simply using the inner optical path, and the correction information can be acquired immediately before the measurement or during distance measurement, and distance measurement can be accomplished, which provides stable results not influenced by temperature change and the changes over time. Also, the correction information can be acquired at real time, and correction can be made dynamically to cope with the temperature change or the changes of the environment where the device is used, and the measurement with high accuracy can be carried out under various conditions in wider range.

Also, the present invention provides an electro-optical distance measuring device, comprising a light source, a photodetection unit, an outer optical path for guiding a light from the light source reflected by an object to be measured toward the photodetection unit as a reflection light, an inner optical path for guiding a light from the light source toward the photodetection unit as an inner light, an inner light quantity changing unit for changing light quantity of the inner light, and a control unit including an arithmetic unit for calculating a distance to the object to be measured according to a photodetection signal from the photodetection unit, wherein the control unit receives the inner light by the photodetection unit while changing the light quantity of the inner light by the inner light quantity changing unit and acquires correction information based on a photodetection signal from the photodetection unit. Thus, the correction information can be acquired simply by using the inner optical path, and the correction information can be acquired immediately before the measurement or during the distance measurement, and a product with stable accuracy, which is not influenced by temperature change or the changes over time, can be produced. Also, there is no need to use expensive components with high electrical property, which is not influenced by temperature change. Accordingly, it is possible to reduce the manufacturing cost and to acquire the correction information at real time. The product can adequately and dynamically cope with the temperature change and the changes of the environment where the device is used. The product can be used under various conditions in wider range. Further, the adjustment in the manufacturing process is not required because the correction information is acquired by the electro-optical distance measuring device itself. Complicated facilities for adjustment are not required either, and the manufacturing cost can be reduced.

The invention claimed is:

1. An electro-optical distance measuring method for projecting a light from a light source toward an object to be measured, for receiving a reflection light from the object to be measured at a photodetection unit, for receiving the light from said light source as an inner light via an inner optical path by said photodetection unit, and for measuring a distance to the object to be measured according to the result of photodetection of said reflection light and said inner light of said photodetection unit, wherein said method comprises a correction information acquiring step where a reference light quantity is set with respect to a light quantity of said inner light, and the change in photodetection signal is detected from said photodetection unit when said light quantity of said inner light is changed, and the relation between light quantity change and phase change is acquired as correction information, and a calculating step, wherein said calculating step is to obtain the deviation of phase from said correction information based on the difference in the light quantity between the light quantity of said reflection light and said reference light quantity, said deviation is set as a correction value and to calculate a distance from said correction value and the result of photodetection of said reflection light and said inner light of said photodetection unit.

2. An electro-optical distance measuring method according to claim 1, wherein said calculating step changes the light quantity of said inner light and performs the calculation a plurality of times and further comprises an updating step for updating said correction information based on a first photodetection signal acquired from said photodetection unit on a first light quantity and on a second photodetection signal acquired from said photodetection unit on a second light quantity.

3. An electro-optical distance measuring method according to claim 2, wherein said first light quantity is a preset reference light quantity and said second light quantity is gradually changed.

4. An electro-optical distance measuring method according to claim 1, wherein said correction information acquiring step is executed when power is turned on to an electro-optical distance measuring device for performing electro-optical distance measurement.

5. An electro-optical distance measuring method according to claim 1, wherein said inner optical path includes a first inner optical path and a second inner optical path being different in optical length, and wherein said correction information acquiring step is to acquire said correction information according to a first inner light passing via said first inner optical path and to a second inner light passing via said second inner optical path.

6. An electro-optical distance measuring method according to claim 1, wherein said inner optical path includes a first inner optical path and a second inner optical path being different in optical length, and wherein said calculating step comprises a calculating prior to correction step for calculating a distance prior to correction based on said reflection light and based on a first inner light passing via said first inner optical path or based on a second inner light passing via said second inner optical path, and an updating step for updating said correction information based on said first inner light and said second inner light.

7. An electro-optical distance measuring method according to claim 5 or 6, wherein said first inner light is set to a reference light quantity, and the light quantity of said second inner light is gradually changed.

8. An electro-optical distance measuring method according to claim 5 or 6, wherein said second inner optical path has an optical fiber of a predetermined length.

9. An electro-optical distance measuring method according to claim 6, wherein said calculating step further comprises a preliminary measurement step for measuring a distance to the object to be measured only by said reflection light, and a selecting step for selecting the calculation of a distance according to which of said first inner light or said second inner light based on the result obtained in said preliminary measurement step.

10. An electro-optical distance measuring device, comprising a light source, a photodetection unit, an outer optical path for guiding a light from said light source reflected by an object to be measured toward said photodetection unit as a reflection light, an inner optical path for guiding a light from said light source toward said photodetection unit as an inner light, an inner light quantity changing unit for changing light quantity of said inner light, and a control unit including an arithmetic unit for calculating a distance to said object to be measured according to a photodetection signal from said photodetection unit, wherein said control unit receives said inner light by said photodetection unit while changing the light quantity of said inner light by said inner light quantity changing unit and acquires the relation between a change in light quantity and a change in phase of a photodetection signal from said photodetection unit as a correction information.

11. An electro-optical distance measuring device according to claim 10, wherein said control unit comprises a storage unit for storing said correction information, and wherein said arithmetic unit sets a reference light quantity with respect to a light quantity of an inner light, obtains a deviation of phase from said correction information based on the difference in light quantity between the light quantity of said reflection light and said reference light quantity, and sets said deviation as the correction value, calculates a distance based on a photodetection signal of said reflection light, based on a photodetection signal of said inner light, and based on said correction value.

12. An electro-optical distance measuring device according to claim 10, wherein said inner optical path has a first inner optical path and a second inner optical path being different in optical length, wherein said inner light quantity changing unit is provided on one of said first inner optical path or said second inner optical path, and wherein said control unit acquires said correction information based on a signal of a light passing via said first inner optical path and said second inner optical path among the signals received by said photodetection unit.

13. An electro-optical distance measuring device according to claim 11, wherein said inner optical path has a first inner optical path and a second inner optical path being different in optical length, wherein said inner light quantity changing unit is provided on one of said first inner optical path or said second inner optical path, and wherein said control unit acquires said correction information based on a signal of a light passing via said first inner optical path and said second inner optical path among the signals received by said photodetection unit and updates said correction information stored by said updated correction information.

* * * * *